United States Patent
Galpin et al.

(10) Patent No.: US 12,323,633 B2
(45) Date of Patent: Jun. 3, 2025

(54) DEEP PREDICTION REFINEMENT

(71) Applicant: InterDigital Madison Patent Holdings, SAS, Paris (FR)

(72) Inventors: Franck Galpin, Thorigne-Fouillard (FR); Philippe Bordes, Laille (FR); Thierry Dumas, Rennes (FR); Karam Naser, Mouazé (FR); Pavel Nikitin, Rennes (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 173 days.

(21) Appl. No.: 18/026,401

(22) PCT Filed: Sep. 14, 2021

(86) PCT No.: PCT/EP2021/075156
§ 371 (c)(1),
(2) Date: Mar. 15, 2023

(87) PCT Pub. No.: WO2022/058293
PCT Pub. Date: Mar. 24, 2022

(65) Prior Publication Data
US 2024/0031611 A1    Jan. 25, 2024

(30) Foreign Application Priority Data

Sep. 15, 2020  (EP) .................................... 20306029
Dec. 18, 2020  (EP) .................................... 20306603
Mar. 16, 2021  (EP) .................................... 21305320

(51) Int. Cl.
*H04N 19/85*     (2014.01)
*H04N 19/176*    (2014.01)

(52) U.S. Cl.
CPC .......... *H04N 19/85* (2014.11); *H04N 19/176* (2014.11)

(58) Field of Classification Search
CPC ........................... H04N 19/85; H04N 19/176
See application file for complete search history.

(56) References Cited

U.S. PATENT DOCUMENTS

2023/0076920 A1*   3/2023   Chen ..................... H04N 19/50

FOREIGN PATENT DOCUMENTS

WO   WO 2021055360 A1    3/2021
WO   WO 2021239500 A1    12/2021

OTHER PUBLICATIONS

Galpin et al., "AHG11: Deep-learning based inter prediction blending", Joint Video Experts Team (JVET) of ITU-T SG 16 WP 3 and ISO/IEC JTC 1/SC 29, Document: JVET-V0076-v2, 22nd Meeting, by teleconference, Apr. 20, 2021, 7 pages.

(Continued)

*Primary Examiner* — Kyle M Lotfi
(74) *Attorney, Agent, or Firm* — Condo Roccia Koptiw LLP

(57) ABSTRACT

A method and an apparatus for deep prediction refinement are disclosed. A first motion-compensated region for a block of a picture and a second region for said block are obtained. A prediction for said block is determined using a Neural Network that uses said first motion-compensated region and said second region.

20 Claims, 30 Drawing Sheets

(56) References Cited

OTHER PUBLICATIONS

Kokaram et al., "Motion-based frame interpolation for film and television effects", The Institution of Engineering and Technology, IET Journals, IET Computer Vision, Special Section: Computer Vision for the Creative Industries, vol. 14, Issue 6, Sep. 23, 2020, 16 pages.
Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v8, 14th Meeting, Geneva, Switzerland, Mar. 19, 2019, 397 pages.
Jiang et al., "Super SloMo: High Quality Estimation of Multiple Intermediate Frames for Video Interpolation", arXiv Labs, Cornell University Library, Computer Science, Computer Vision and Pattern Recognition, Journal Ref. No. CVPR 2018, Jul. 13, 2018, 12 pages.
Mao et al., "Convolutional Neural Network Based Bi-Prediction Utilizing Spatial and Temporal Information in Video Coding", Institute of Electronics and Electrical Engineers (IEEE), IEEE Transactions on Circuits and Systems for Video Technology, vol. 30, No. 7, Jul. 2020, 15 pages.

\* cited by examiner

Original Tensor Shape (1)

Tensor Shape after 1
Stride (2,2)

(2)

Tensor Shape after 2
Strides (2,2)

(3)

Padding of
the Valid
Values (4)

Extraction
(5)

Expansion
(6)

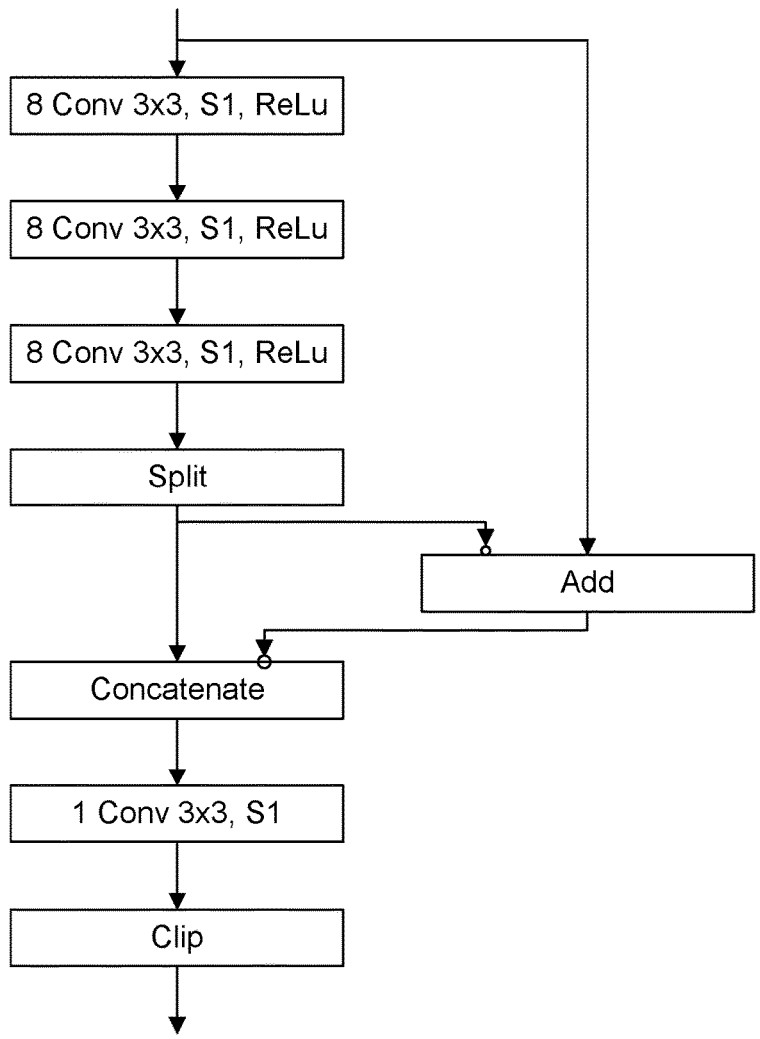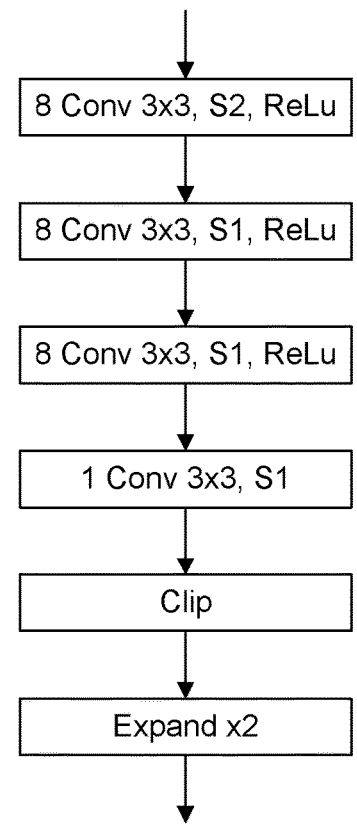
FIG. 35
FIG. 36

DEEP PREDICTION REFINEMENT

CROSS REFERENCE TO RELATED APPLICATIONS

This application is a U.S. National Stage Application under 35 U.S.C. § 371 of International Patent Application No. PCT/EP2021/075156, filed Sep. 14, 2021, which is incorporated herein by reference.

This application claims priority to European Application Nos. (i) 20306029.8, filed Sep. 15, 2020, (ii) 20306603.0, filed Dec. 18, 2020, and (iii) 21305320.0, filed Mar. 16, 2021; each of which incorporated herein by reference in its entirety.

TECHNICAL FIELD

The present embodiments generally relate to a method and an apparatus for prediction refinement in video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method for video encoding is provided. Such a method comprises obtaining a first motion-compensated region for a block of a picture and obtaining a second region for said block, determining a prediction for said block using a Neural Network that uses said first motion-compensated region and said second region and encoding said block based on said prediction.

According to another embodiment, an apparatus for video encoding is provided, comprising one or more processors, wherein said one or more processors are configured to obtain a first motion-compensated region for a block of a picture and obtaining a second region for said block, determining a prediction for said block using a Neural Network that uses said first motion-compensated region and said second region, and encoding said block based on said prediction.

According to another embodiment, an apparatus for video encoding is provided, comprising: means for obtaining a first motion-compensated region for a block of a picture and obtaining a second region for said block, means for determining a prediction for said block using a Neural Network that uses said first motion-compensated region and said second region and means for encoding said block based on said prediction.

According to an embodiment, a method for video decoding is provided. Such a method comprises obtaining a first motion-compensated region for a block of a picture and obtaining a second region for said block, determining a prediction for said block using a Neural Network that uses said first motion-compensated region and said second region and decoding said block based on said prediction.

According to another embodiment, an apparatus for video decoding is provided, comprising one or more processors, wherein said one or more processors are configured to obtain a first motion-compensated region for a block of a picture and obtaining a second region for said block, determining a prediction for said block using a Neural Network that uses said first motion-compensated region and said second region, and decoding said block based on said prediction.

According to another embodiment, an apparatus for video decoding is provided, comprising: means for obtaining a first motion-compensated region for a block of a picture and obtaining a second region for said block, means for determining a prediction for said block using a Neural Network that uses said first motion-compensated region and said second region and means for decoding said block based on said prediction.

According to a variant of any one of the previous embodiments, the prediction is output by the Neural Network. According to another variant, determining the prediction for the block using the Neural Network comprises obtaining a map of prediction refinement parameters for said block using the Neural Network and obtaining a prediction for said block based at least on said first motion-compensated region and said map of prediction refinement parameters.

One or more embodiments also provide a computer program comprising instructions which when executed by one or more processors cause the one or more processors to perform the encoding method or decoding method according to any of the embodiments described above.

One or more of the present embodiments also provide a computer readable storage medium having stored thereon instructions for encoding or decoding video data according to any of the methods described above.

One or more embodiments also provide a computer readable storage medium having stored thereon a bitstream generated according to any of the methods described above.

One or more embodiments also provide a method and apparatus for transmitting or receiving the bitstream generated according to any of the methods described above.

BRIEF DESCRIPTION OF THE DRAWINGS

FIG. 35 illustrates another example of a convolutional Neural Network for determination prediction correction comprising a skip connection with split and addition.

FIG. 36 illustrates another example of a convolutional Neural Network for determination prediction correction with sub-block computation.

DETAILED DESCRIPTION

Figure 1:
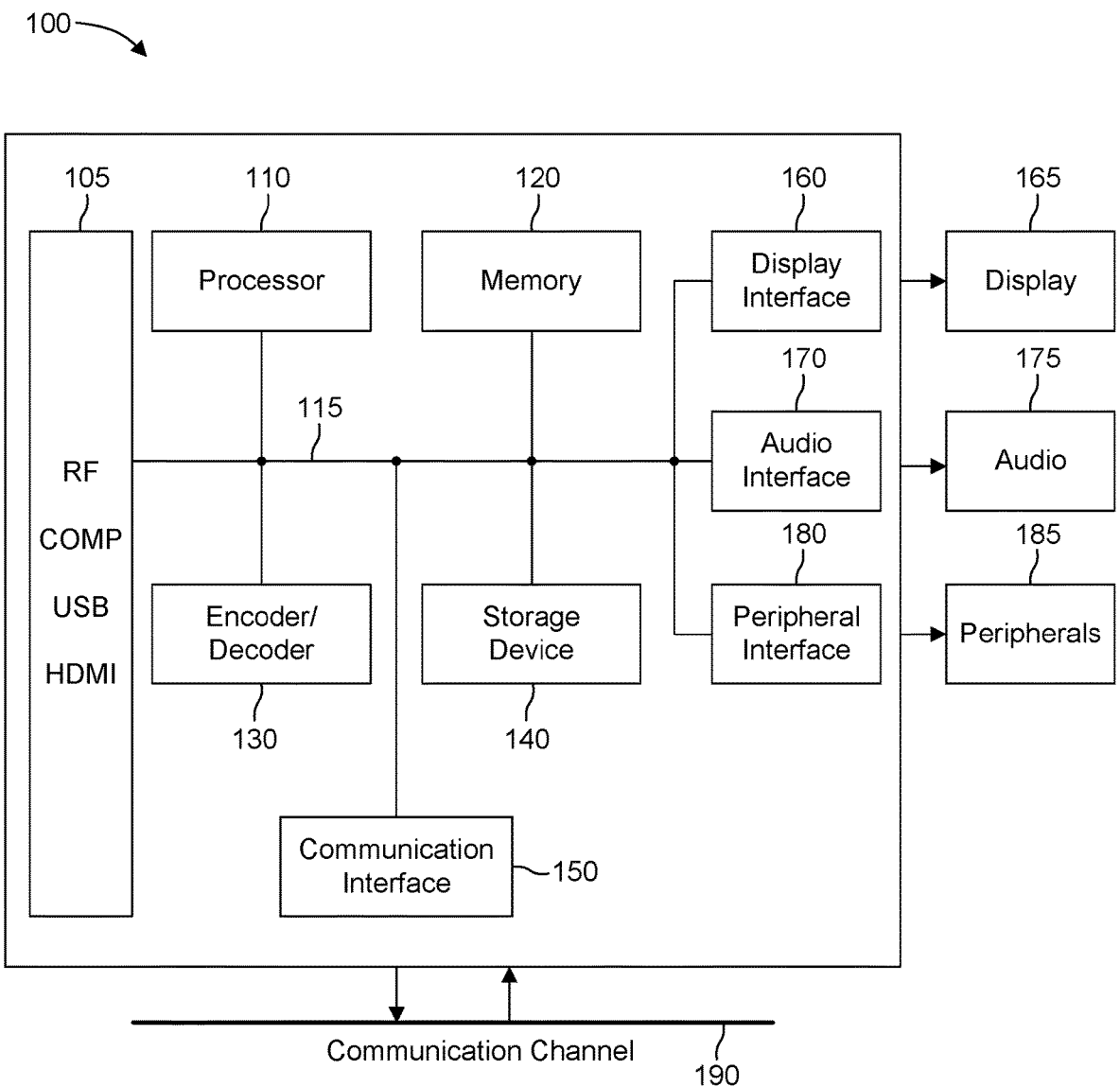
FIG. 1 illustrates a block diagram of a system within which aspects of the present embodiments may be implemented.

FIG. 1 illustrates a block diagram of an example of a system in which various aspects and embodiments can be implemented. System 100 may be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 100, singly or in combination, may be embodied in a single integrated circuit, multiple ICs, and/or discrete components. For example, in at least one embodiment, the processing and encoder/decoder elements of system 100 are distributed across multiple ICs and/or discrete components. In various embodiments, the system 100 is communicatively coupled to other systems, or to other electronic devices, via, for example, a communications bus or through dedicated input and/or output ports. In various embodiments, the system 100 is configured to implement one or more of the aspects described in this application.

The system 100 includes at least one processor 110 configured to execute instructions loaded therein for implementing, for example, the various aspects described in this application. Processor 110 may include embedded memory, input output interface, and various other circuitries as known in the art. The system 100 includes at least one memory 120 (e.g., a volatile memory device, and/or a non-volatile memory device). System 100 includes a storage device 140, which may include non-volatile memory and/or volatile memory, including, but not limited to, EEPROM, ROM, PROM, RAM, DRAM, SRAM, flash, magnetic disk drive, and/or optical disk drive. The storage device 140 may include an internal storage device, an attached storage device, and/or a network accessible storage device, as non-limiting examples.

System 100 includes an encoder/decoder module 130 configured, for example, to process data to provide an encoded video or decoded video, and the encoder/decoder module 130 may include its own processor and memory. The encoder/decoder module 130 represents module(s) that may be included in a device to perform the encoding and/or decoding functions. As is known, a device may include one or both of the encoding and decoding modules. Additionally, encoder/decoder module 130 may be implemented as a separate element of system 100 or may be incorporated within processor 110 as a combination of hardware and software as known to those skilled in the art.

Program code to be loaded onto processor 110 or encoder/decoder 130 to perform the various aspects described in this application may be stored in storage device 140 and subsequently loaded onto memory 120 for execution by processor 110. In accordance with various embodiments, one or more of processor 110, memory 120, storage device 140, and encoder/decoder module 130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 110 and/or the encoder/decoder module 130 is used to store instructions and to provide working memory for processing that is needed during encoding or decoding. In other embodiments, however, a memory external to the processing device (for example, the processing device may be either the processor 110 or the encoder/decoder module 130) is used for one or more of these functions. The external memory may be the memory 120 and/or the storage device 140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 100 may be provided through various input devices as indicated in block 105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 100 to other electronic devices across USB and/or HDMI connections. It is to be understood that various aspects of input processing, for example, Reed-Solomon error correction, may be implemented, for example, within a separate input processing IC or within processor 110 as necessary. Similarly, aspects of USB or HDMI interface processing may be implemented within separate interface ICs or within processor 110 as necessary. The demodulated, error corrected, and demultiplexed stream is provided to various processing elements, including, for example, processor 110, and encoder/decoder 130 operating in combination with the memory and storage elements to process the datastream as necessary for presentation on an output device.

Various elements of system 100 may be provided within an integrated housing, Within the integrated housing, the various elements may be interconnected and transmit data therebetween using suitable connection arrangement 115, for example, an internal bus as known in the art, including the I2C bus, wiring, and printed circuit boards.

The system 100 includes communication interface 150 that enables communication with other devices via communication channel 190. The communication interface 150 may include, but is not limited to, a transceiver configured to transmit and to receive data over communication channel 190. The communication interface 150 may include, but is not limited to, a modem or network card and the communication channel 190 may be implemented, for example, within a wired and/or a wireless medium.

Data is streamed to the system 100, in various embodiments, using a Wi-Fi network such as IEEE 802.11. The Wi-Fi signal of these embodiments is received over the communications channel 190 and the communications interface 150 which are adapted for Wi-Fi communications. The communications channel 190 of these embodiments is typically connected to an access point or router that provides access to outside networks including the Internet for allowing streaming applications and other over-the-top communications. Other embodiments provide streamed data to the system 100 using a set-top box that delivers the data over the HDMI connection of the input block 105. Still other embodiments provide streamed data to the system 100 using the RF connection of the input block 105.

The system 100 may provide an output signal to various output devices, including a display 165, speakers 175, and other peripheral devices 185. The other peripheral devices 185 include, in various examples of embodiments, one or more of a stand-alone DVR, a disk player, a stereo system, a lighting system, and other devices that provide a function based on the output of the system 100. In various embodiments, control signals are communicated between the system 100 and the display 165, speakers 175, or other peripheral devices 185 using signaling such as AV.Link, CEC, or other communications protocols that enable device-to-device control with or without user intervention. The output devices may be communicatively coupled to system 100 via dedicated connections through respective interfaces 160, 170, and 180. Alternatively, the output devices may be connected to system 100 using the communications channel 190 via the communications interface 150. The display 165 and speakers 175 may be integrated in a single unit with the other components of system 100 in an electronic device, for example, a television. In various embodiments, the display interface 160 includes a display driver, for example, a timing controller (T Con) chip.

The display 165 and speaker 175 may alternatively be separate from one or more of the other components, for example, if the RF portion of input 105 is part of a separate set-top box. In various embodiments in which the display 165 and speakers 175 are external components, the output signal may be provided via dedicated output connections, including, for example, HDMI ports, USB ports, or COMP outputs.

Figure 2:
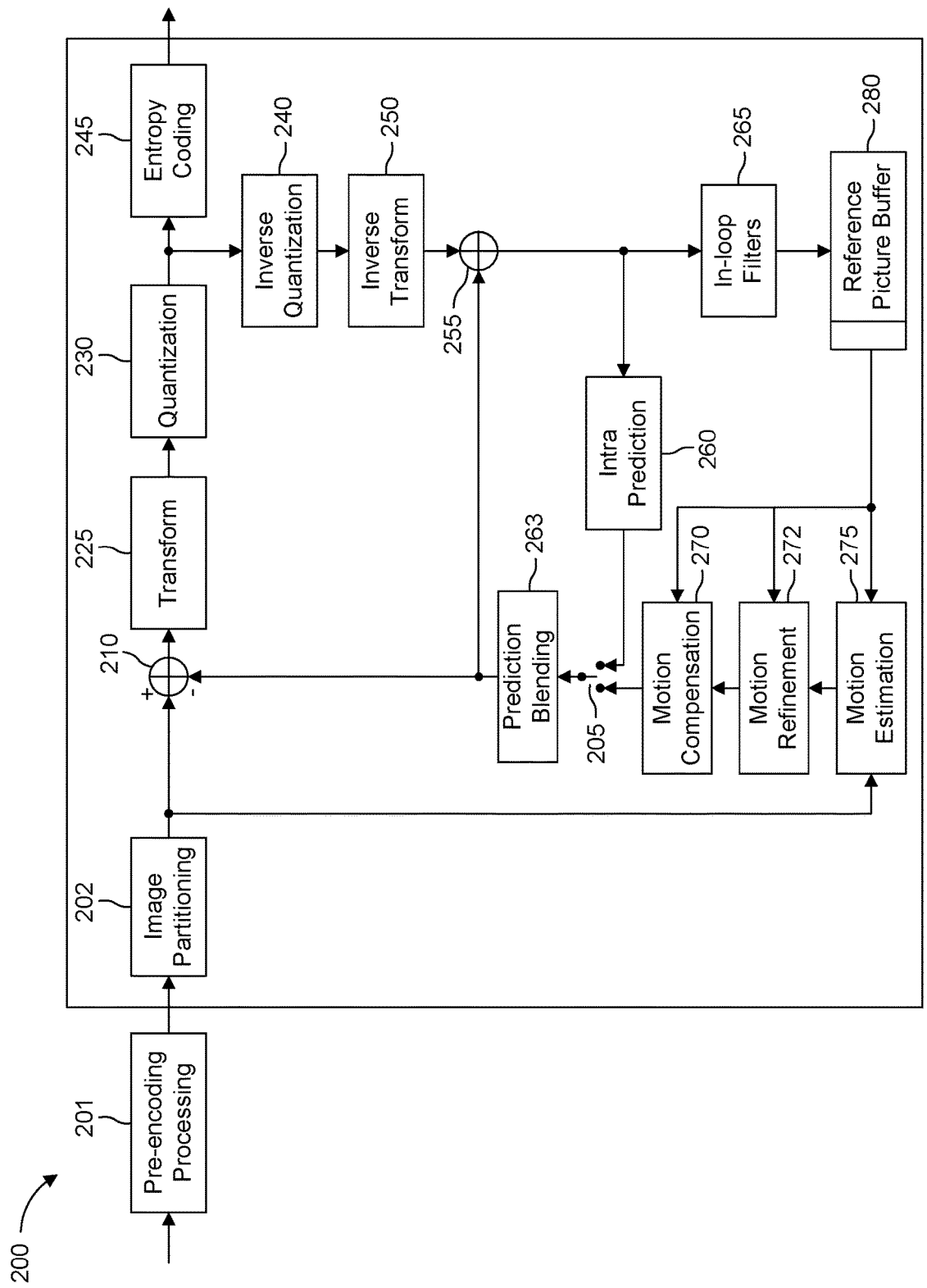
FIG. 2 illustrates a block diagram of an embodiment of a video encoder.

FIG. 2 illustrates an example video encoder 200, such as a High Efficiency Video Coding (HEVC) encoder. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, the terms "pixel" or "sample" may be used interchangeably, and the terms "image," "picture" and "frame" may be used interchangeably.

Before being encoded, the video sequence may go through pre-encoding processing (201), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 200, a picture is encoded by the encoder elements as described below. The picture to be encoded is partitioned (202) and processed in units of, for example, CUs. Each unit is encoded using, for example, either an intra or inter mode. When a unit is encoded in an intra mode, it performs intra prediction (260). In an inter mode, motion estimation (275) and compensation (270) are performed. The encoder decides (205) which one of the intra mode or inter mode to use for encoding the unit, and indicates the intra/inter decision by, for example, a prediction mode flag. The encoder may also blend (263) intra prediction result and inter prediction result, or blend results from different intra/inter prediction methods.

Prediction residuals are calculated, for example, by subtracting (210) the predicted block from the original image block. The motion refinement module (272) uses already available reference picture in order to refine the motion field of a block without reference to the original block. A motion field for a region can be considered as a collection of motion vectors for all pixels with the region. If the motion vectors are sub-block-based, the motion field can also be represented as the collection of all sub-block motion vectors in the region (all pixels within a sub-block has the same motion vector, and the motion vectors may vary from sub-block to sub-block). If a single motion vector is used for the region, the motion field for the region can also be represented by the single motion vector (same motion vectors for all pixels in the region).

The prediction residuals are then transformed (225) and quantized (230). The quantized transform coefficients, as well as motion vectors and other syntax elements, are entropy coded (245) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. In-loop filters (265) are applied to the reconstructed picture to perform, for example, deblocking/SAO (Sample Adaptive Offset) filtering to reduce encoding artifacts. The filtered image is stored at a reference picture buffer (280).

Figure 3:
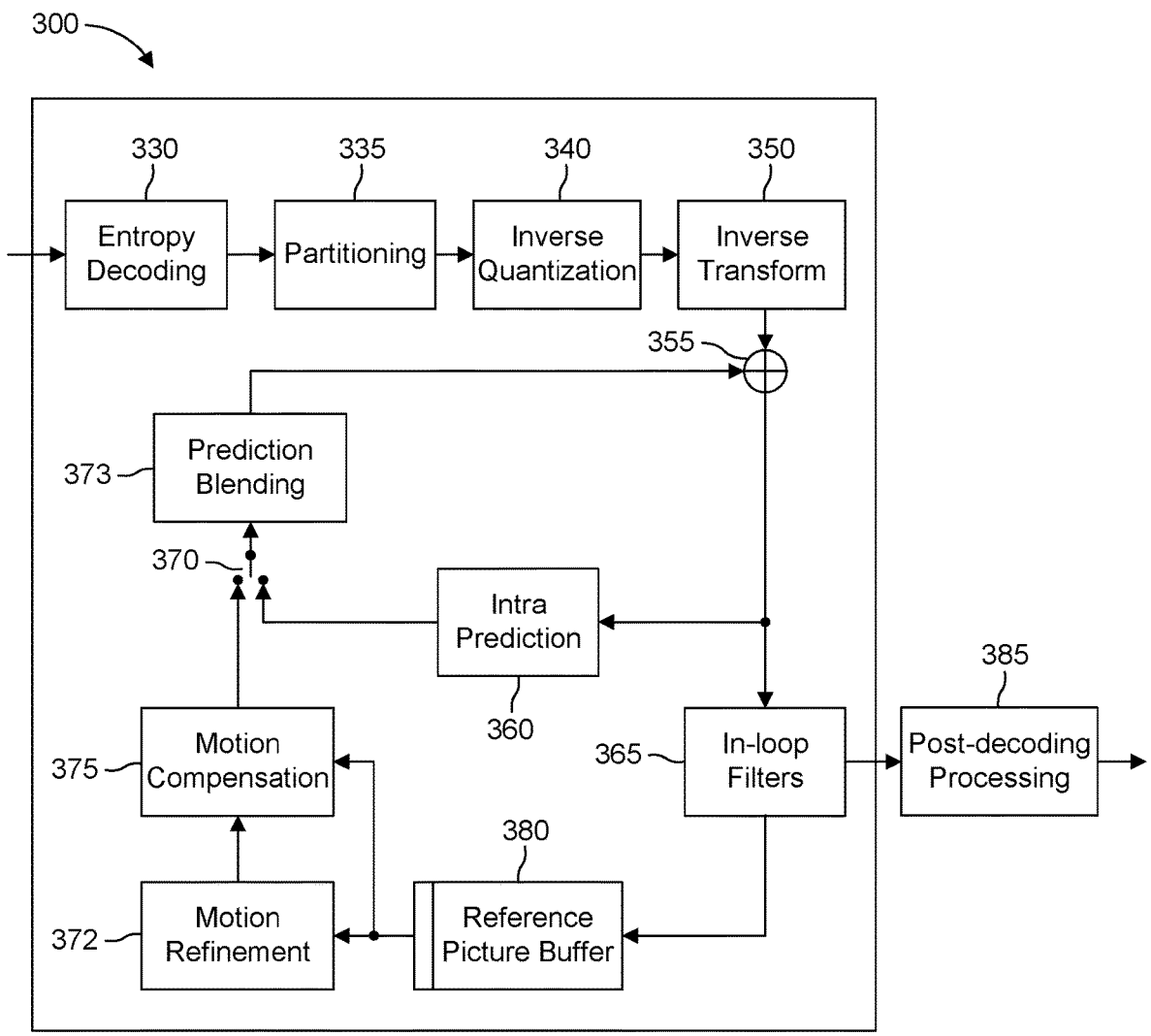
FIG. 3 illustrates a block diagram of an embodiment of a video decoder.

FIG. 3 illustrates a block diagram of an example video decoder 300. In the decoder 300, a bitstream is decoded by the decoder elements as described below. Video decoder 300 generally performs a decoding pass reciprocal to the encoding pass as described in FIG. 2. The encoder 200 also generally performs video decoding as part of encoding video data.

In particular, the input of the decoder includes a video bitstream, which can be generated by video encoder 200. The bitstream is first entropy decoded (330) to obtain transform coefficients, motion vectors, and other coded information. The picture partition information indicates how the picture is partitioned. The decoder may therefore divide (335) the picture according to the decoded picture partitioning information. The transform coefficients are de-quantized (340) and inverse transformed (350) to decode the prediction residuals. Combining (355) the decoded prediction residuals and the predicted block, an image block is reconstructed.

The predicted block can be obtained (370) from intra prediction (360) or motion-compensated prediction (i.e., inter prediction) (375). The decoder may blend (373) the intra prediction result and inter prediction result, or blend results from multiple intra/inter prediction methods. Before motion compensation, the motion field may be refined (372) by using already available reference pictures. In-loop filters (365) are applied to the reconstructed image. The filtered image is stored at a reference picture buffer (380).

The decoded picture can further go through post-decoding processing (385), for example, an inverse color transform (e.g. conversion from YCbCr 4:2:0 to RGB 4:4:4) or an inverse remapping performing the inverse of the remapping process performed in the pre-encoding processing (201). The post-decoding processing can use metadata derived in the pre-encoding processing and signaled in the bitstream.

Decoder Side Motion Vector Refinement in VVC

Figure 4:
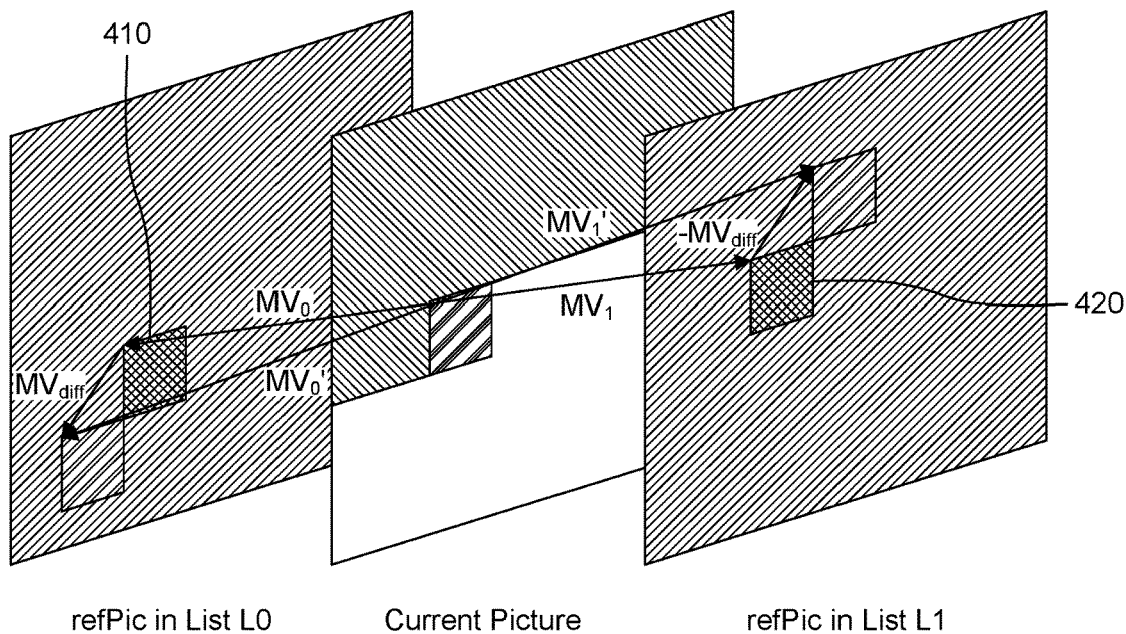
FIG. 4 illustrates Decoder Side Motion Vector Refinement (DMVR) in VVC draft 5.

FIG. 4 illustrates Decoder Side Motion Vector Refinement (DMVR) as used in VVC draft 5. It consists in refining a pair of bi-directional motion vectors, around two initial MVs ($MV_0$, $MV_1$) in reference picture lists L0 and L1. The motion vectors are refined by minimizing the SAD (Sum of Absolute Differences) between the two refined reference blocks (410, 420). The refined motion vectors MV'$_0$ and MV'$_1$ are then used to perform the motion-compensated bi-prediction of the current block in the current picture.

In VVC, DMVR is applied for the CUs which fulfill the following conditions:
 The CU is coded in merge mode with bi-prediction.
 One reference picture is in the past and another reference picture is in the future with respect to the current picture.
 The reference pictures in list L0 and list L1 have equal temporal distance to the current picture.
 The CU size is higher than 128 luma samples and the CU height and width is at least 8 luma samples.

The refined MVs derived by DMVR are used for INTER prediction of CUs to code and are stored in the temporal motion buffer. Thus, they may be used for the temporal prediction of motion information in subsequent pictures to code/decode. On the contrary, original, non-DMVR-refined motion vectors are used in the deblocking filtering process and for spatial motion vector prediction of future coding units in the same picture.

As shown in FIG. 4, the search points are surrounding the initial MV and the MV offset obeys the MV difference symmetrical rule. In other words, any points that are checked by DMVR, denoted by candidate MV pair (MV'$_0$, MV'$_1$) obey the following two equations:

$$MV'_0 = MV_0 + MV_{offset}$$

$$MV'_1 = MV_1 - MV_{offset}$$

where $MV_{offset}$ represents the refinement offset between the initial MV and the refined MV in one of the reference pictures. In VVC draft 5, the refinement search range is two integer luma samples from the initial MV. and sub-pixel motion refinement is computed directly from the SAD values obtained at the various integer displacement positions by fitting a quadratic curve and computing the minimum.

As described above, DMVR allows to automatically refine at the decoder side a bi-directional motion field sent by the encoder. However, the refinement is done using traditional motion estimation (block matching) using sub-block refinement. Moreover, the pixel motion is still based on a defined motion accuracy (typically ¼ pixel motion).

Bi-Prediction and Generalized Bi-Prediction

Figure 5A:
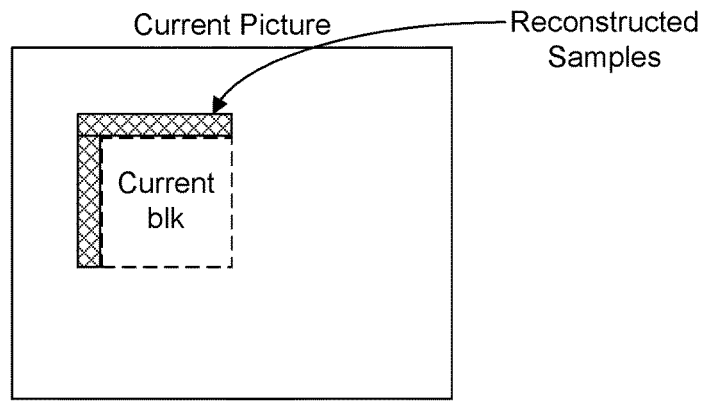
FIG. 5A illustrates intra prediction in block-based video coding scheme.
Figure 5B:
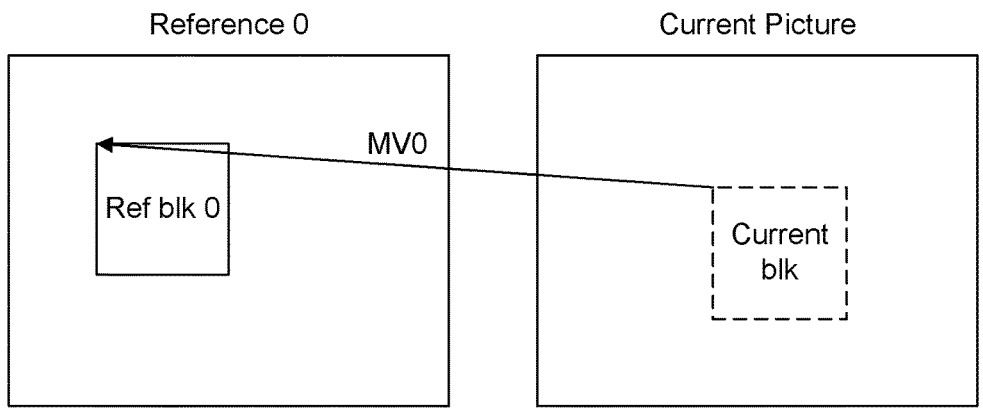
FIG. 5B illustrates inter prediction in block-based video coding scheme.

In block-based video coding scheme such as HEVC, two main coding modes are used. In intra mode, the block prediction is computed using reconstructed samples of the current slice or picture (e.g. neighboring samples to the current block) as depicted in FIG. 5A. In inter mode, the block prediction is computed from a Motion Compensated (MC) block of one reference picture that was previously reconstructed as depicted in FIG. 5B.

Bi-Prediction

In bi-prediction, two prediction blocks ($Pred_0$ and $Pred_1$) are computed using two reference pictures from two the lists L0 and L1 respectively. The reference picture used to compute $Pred_0$ has reference index $ref_0$ and the reference picture used to compute $Pred_1$ has reference index $ref_1$. Next, the prediction blocks $Pred_0$ and $Pred1$ are combined to form one single prediction block $Pred_{bi}$ as in (1):

$$Pred_{bi}[x] = (Pred_0[x] + Pred_1[x] + 1) >> 1 \quad (1),$$

where x is a pixel of a prediction block.

Generalized Bi-Prediction (GBI aka BCW or AWP in VVC Draft 5)

In generalized bi-prediction, the weights ($w_0$ and $w_1$) used for the combination are not necessarily equal to one:

$$Pred_{gbi} = (w_0 \cdot Pred_0[x] + w_1 \cdot Pred_1[x] + off)/(w_0 + w_1) \quad (2),$$

with off being an offset value.

In a variant, to facilitate the implementation, (2) is simplified as (3):

$$Pred_{gbi} = (w_0 \cdot Pred_0[x] + w_1 \cdot Pred_1[x] + 1) >> 1 \quad (3)$$

In VVC draft 5, it is proposed to use indexed ("gbi_index") pre-defined weights. The syntax element "gbi_index" is coded for $w_1$ ($w_0$ is deduced from $w_1$ as $w_0 = 1 - w_1$) using fixed binarization as depicted in Table 1, for instance:

TABLE 1

| Binarization of GBi index. | | |
|---|---|---|
| GBi Index | Weight value of $w_1$ | Binarization of GBi Index |
| 0 | −¼ | 0000 |
| 1 | ⅜ | 001 |
| 2 | ½ | 1 |
| 3 | ⅝ | 01 |
| 4 | 5/4 | 0001 |

The syntax element "gbi_index" is coded for each CU coded in inter bi-prediction, except in merge mode where the value of "gbi_index" is inferred from the GBI weights of the neighboring CU from which the current CU inherits other parameters.

At the encoder side, all the GBI weights are tested and the one which minimizes the encoding cost ("RD-cost" criterion) for this CU is finally coded in the bitstream. Typically, the "RD-cost" measure is a Lagrangian defined as:

$$RDcost = distortion + lambda \cdot cost \quad (4)$$

Where "distortion" is a measure of the quality (e.g. L1-norm or L2-norm), "cost" is (an estimation of) the number of bits to encode the current CU and "lambda" is the Lagrangian multiplier.

Prediction weighting has been introduced in recent video codecs such as VVC. Such a tool is a block-based weighting, i.e. the weighting is uniform on the block. It requires to send side information for the weighting between the two predictions to the decoder. Also, because of the signaling cost of the weights, the weights belong to a limited set of values (typically 5 values in VVC).

Illumination Compensation (IC)

In a version of the Joint Exploration Model (JEM) and in the VVC reference software (VVC draft 5) developed by the JVET (Joint Video Exploration Team) group, some additional temporal prediction tools with associated parameters determined at the decoder side, including the Local Illumination Compensation (LIC), have been proposed. Basically, a purpose of LIC is to compensate for illumination change which may occur between a predicted block and its reference block employed through motion compensated temporal prediction.

Figure 6A:
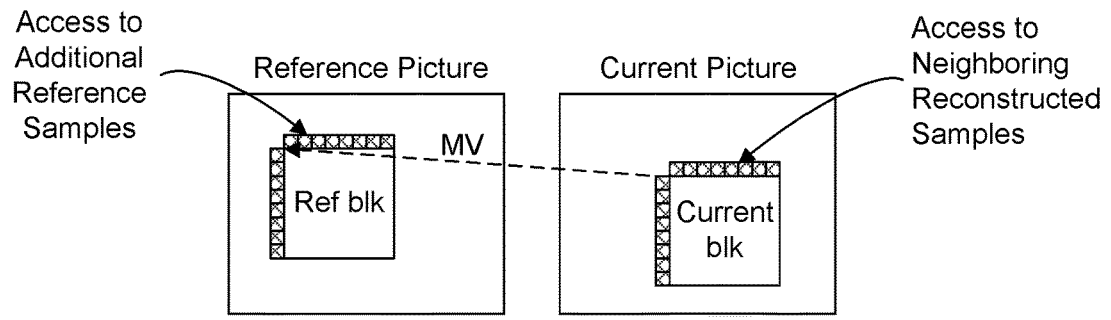
FIGS. 6A, 6B and 6C illustrate an example of Local Illumination Compensation (LIC) parameters derivation from neighboring reconstructed samples and corresponding reference samples translated with motion vectors, respectively for square Coding Unit, rectangle Coding Unit and sub-block-based prediction, in Joint Exploration Model (JEM) and VVC reference software.
Figure 6B:
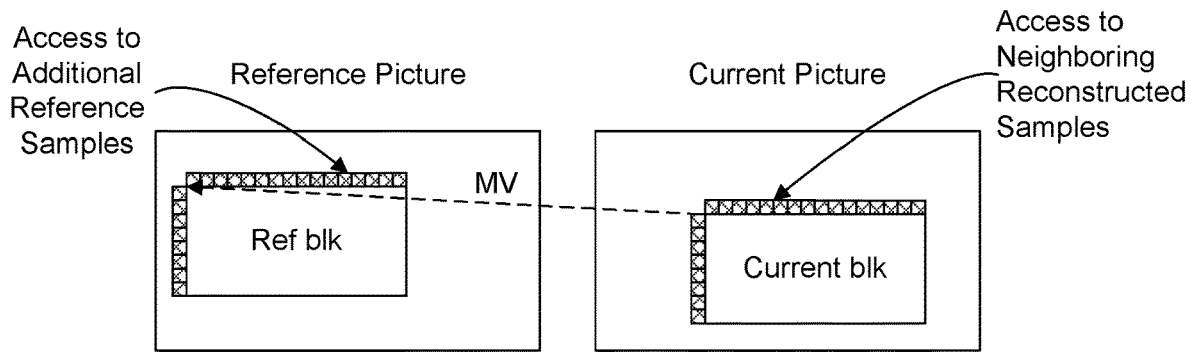
Figure 6C:
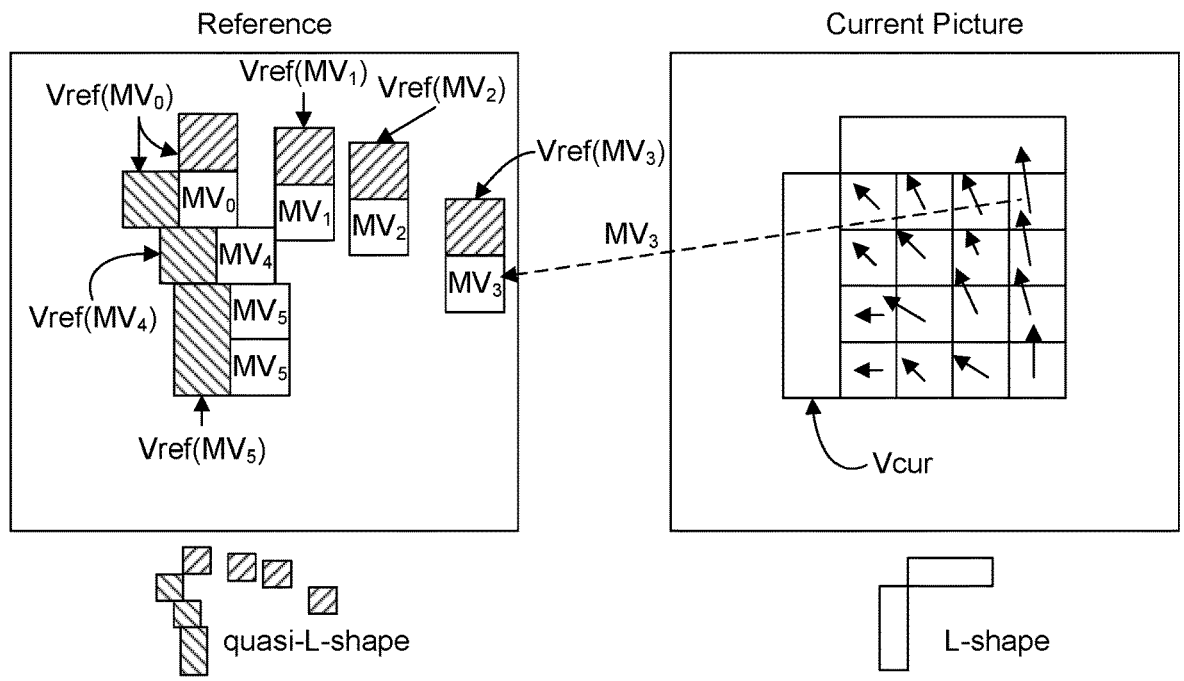

The use of LIC is typically signaled at the CU level, through a flag (LIC flag) associated with each coding unit (CU) coded in inter mode. When this tool is activated and LIC flag is true, the decoder computes some prediction parameters based on neighboring reconstructed picture samples, localized on the left and/or on the top of the current block to be predicted typically and the corresponding reference picture samples localized on the left and/or on the top of the reference block as illustrated in FIG. 6A-C. In the considered prior art codec (JEM), the use of LIC for a given block depends on a flag associated to this block, called the LIC flag.

In the following, the term "L-shape" associated to the current or reference block stands for a set of samples composed of the samples situated on the row above the current (resp. reference) block and of the samples situated on the column at the left of the current (resp. reference) block, as depicted in grey in FIG. 6A-C.

The LIC parameters (a,b) are weight and offset derived from the reconstructed and reference samples of the "L-shape". For example, the derivation of the LIC parameters may be based on the minimization of an error between current samples and linearly modified reference samples, which is defined as follows:

$$\text{dist} = \Sigma_{r \in Vcur, s \in Vref}(\text{rec\_cur}(r) - a \cdot \text{rec\_ref}(s) - b)^2 \quad (5)$$

where: rec_cur(r) is a neighboring reconstructed sample in current picture (on the right of FIG. 6A-C), rec_ref(s) is a reference sample built with MC from reference picture (on the left of FIG. 6A-C), corresponding to reconstructed sample r, with s=r+mv, rec_cur(r) and rec_ref(r) are co-located samples in the reconstructed and reference L-shape respectively.

FIG. 6A_C illustrates the derivation of the LIC parameters from neighboring reconstructed samples and the corresponding reference samples translated with the motion vector MV, in the case of a square CU (FIG. 6A), a rectangle CU (FIG. 6B) and a sub-block based prediction (FIG. 6C). In the case of sub-black based prediction, a quasi-L-shape is used for collecting reconstructed reference samples.

The values of (a,b) are obtained using a least square minimization as in (6) for instance:

$$a = \left( \frac{\sum ref(s) \times cur(r) - \frac{\sum ref(s) \times cur(r)}{N}}{\sum cur(r)^2 - \frac{\sum ref(s) \times \sum ref(s)}{N}} \right) \quad (6)$$

$$b = \frac{\sum cur(r)}{N} - a \times \frac{\sum ref(s)}{N}$$

Once the LIC parameters are obtained by the encoder or the decoder for the current CU, then the prediction pred (current_block) of the current CU consists in the following (in the case of the uni-directional prediction case): pred (current_block)=a×ref_block+b (7) where current_block is the current block to predict, pred(current_block) is the prediction of the current block, and ref_block is the reference block built with regular Motion Compensation (MC) process and used for the temporal prediction of the current block.

Figure 7:
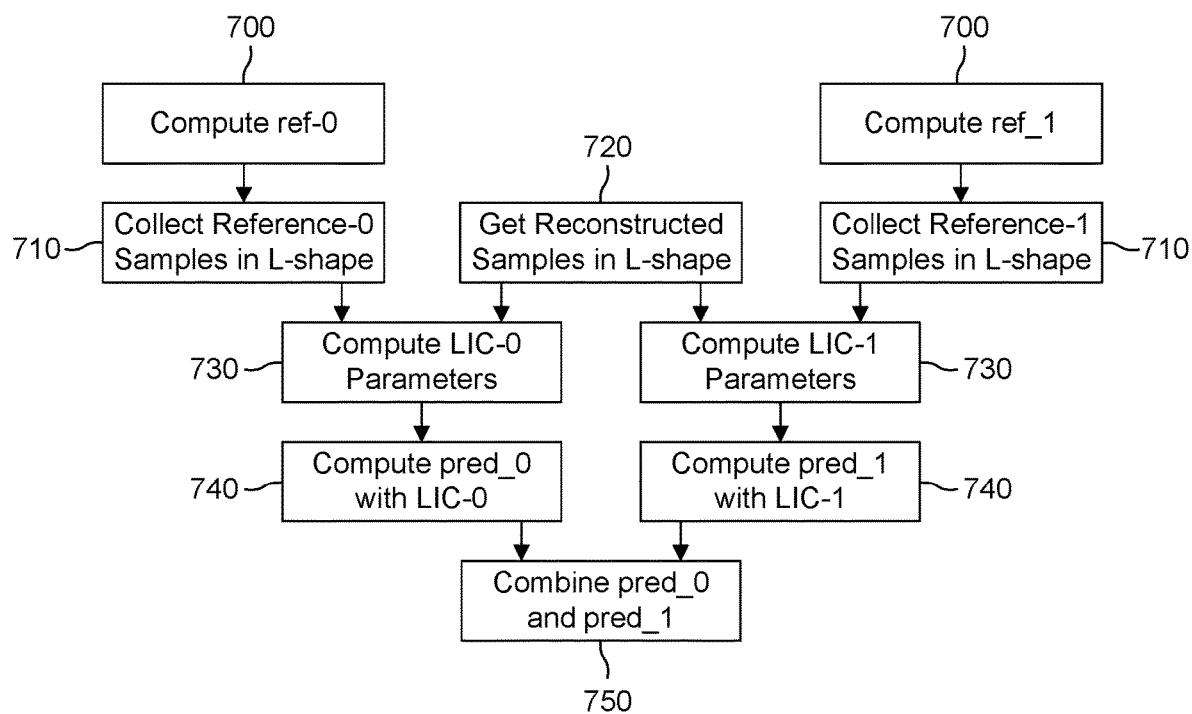
FIG. 7 illustrates an example of derivation of LIC parameters and application for each prediction L0 and L1 reference list in the case of bi-prediction.

In case of bi-prediction, the LIC process is applied twice, as illustrated in FIG. 7, on the prediction computed from the reference picture list 0 and on the prediction computed from the reference picture list 1. Reference picture ref_0 and ref_1 are previously reconstructed (700). Reference samples from the L-shape of the motion-compensated reference block are respectively collected (710). Reconstructed samples in the L-shape of the current block are obtained (720). The LIC parameters LIC_0 and LIC_1 are respectively computed (730) using for instance equation (6). The prediction pred_0 and pred_1 from each reference picture ref_0 and ref_1 are respectively computed using the corresponding LIC_0 and LIC_1 parameters using for instance equation (7).

The two predictions are combined together (750) as usual using default weighting: Pred=(pred_0+pred_1+1)>>1) or bi-prediction weighted averaged (BPWA): Pred= (g0·pred_0+g1·pred_1+(1<<(s−1)))>>s). Such a method is called method-a.

In a variant, called herein method-b, in case of bi-prediction, instead of using the L-shape samples, reference samples of the motion compensated block (or a subset of them) are directly used to compute the coefficients a and b.

Illumination compensation has been evaluated in JEM and proved to bring some gains by improving the final prediction. However, the weighting is block-based and the IC process might need information outside the reference blocks to compute the final parameters.

Bi-Directional Optical Flow

An optical flow-based refinement, also called BDOF, is used in the VVC standard. The bi-directional optical flow (BDOF) may be also referred to as BIO. According to an embodiment, BDOF allows to refine the bi-prediction signal of a CU at the 4×4 sub-block level. BDOF may be applied to a CU if the CU satisfies the following conditions:

the CU's height is not 4, and the CU is not in size of 4×8, the CU is not coded using affine mode or the ATMVP merge mode;

CU is coded using "true" bi-prediction mode, i.e., one of the two reference pictures is prior to the current picture in display order and the other is after the current picture in display order.

In a variant, BDOF is only applied to the luma component.

The BDOF mode is based on the optical flow concept, which assumes that the motion of an object is smooth and its luminance is constant along the considered time interval. For each 4×4 sub-block, a motion refinement $(v_x, v_y)$ is calculated by minimizing the difference between the L0 and L1 prediction samples obtained from reference picture of the L0 and L1 reference picture lists. The motion refinement is then used to adjust the bi-predicted sample values in the 4×4 sub-block. The following steps are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals are computed by directly calculating the difference between two neighboring samples, i.e., $$\frac{\partial I^{(k)}}{\partial x}(i, j) = (I^{(k)}(i+1, j) - I^{(k)}(i-1, j)) \gg 4$$

$$\frac{\partial I^{(k)}}{\partial y}(i, j) = (I^{(k)}(i, j+1) - I^{(k)}(i, j-1)) \gg 4$$

here $I^{(k)}(i,j)$ are the sample value at coordinate (i,j) of the prediction signal in list k, k=0,1. Then, the auto- and cross-correlation of the gradients, $S_1$, $S_2$, $S_3$, $S_5$ and $S_6$, are calculated as $$S_1 = \Sigma_{(i,j) \in \Omega} \psi_x(i,j) \cdot \psi_x(i,j), S_3 = \Sigma_{(i,j) \in \Omega} \theta(i,j) \cdot \psi_x(i,j)$$

$$S_2 = \Sigma_{(i,j) \in \Omega} \psi_x(i,j) \cdot \psi_y(i,j)$$

$$S_5 = \Sigma_{(i,j) \in \Omega} \psi_y(i,j) \cdot \psi_y(i,j), S_6 = \Sigma_{(i,j) \in \Omega} \theta(i,j) \cdot \psi_y(i,j)$$

Where:

$$\psi_x(i,j) = \left(\frac{\partial I^{(1)}}{\partial x}(i,j) + \frac{\partial I^{(0)}}{\partial x}(i,j)\right) \gg n_a$$

$$\psi_y(i,j) = \left(\frac{\partial I^{(1)}}{\partial y}(i,j) + \frac{\partial I^{(0)}}{\partial y}(i,j)\right) \gg n_a$$

$$\theta(i,j) = (I^{(1)}(i,j) \gg n_b) - (I^{(0)}(i,j) \gg n_b)$$

where $\Omega$ is a 6×6 window surrounding the 4×4 sub-block.

The motion refinement $(v_x, v_y)$ is then derived using the cross- and auto-correlation terms using the following:

$$v_x = S_1 > 0 ? \text{clip3}(-th'_{BIO}, th'_{BIO}, -((S_3 \cdot 2^{n_b - n_a}) \gg \lfloor \log_2 S_1 \rfloor)) : 0$$

$$v_y = S_5 > 0 ? \text{clip3}(-th'_{BIO}, th'_{BIO}, -((S_6 \cdot 2^{n_b - n_a} - ((v_x S_{2,m}) \ll n_{s_2} + v_x S_{2,s})/2) \gg \lfloor \log_2 S_5 \rfloor)) : 0$$

where $$S_{2,m} = S_2 \gg n_{s_2},\ S_{2,s} = S_2\ \&(2^{n_{s_2}} - 1),\ th'_{BIO} = 2^{13-BD}$$

and $\lfloor \cdot \rfloor$ is the floor function, and BD is the bit-depth of the picture of video sequence.

Based on the motion refinement and the gradients, the following adjustment is calculated for each sample in the 4×4 sub-block:

$$b(x,y) = rnd\left(\left(v_x\left(\frac{\partial I^{(1)}(x,y)}{\partial x} - \frac{\partial I^{(0)}(x,y)}{\partial x}\right)\right)/2\right) + rnd\left(\left(v_y\left(\frac{\partial I^{(1)}(x,y)}{\partial y} - \frac{\partial I^{(0)}(x,y)}{\partial y}\right)\right)/2\right)$$

Finally, the BDOF samples of the CU are calculated by adjusting the bi-prediction samples as follows:

$$pred_{BDOF}(x,y) = (I^{(0)}(x,y) + I^{(1)}(x,y) + b(x,y) + o_{offset}) \ll shift$$

Where $o_{offset}$ and shift are the values for centering and renormalizing the prediction on the bit depth of the picture to encode.

As an example, in the above, the values of $n_a$, $n_b$ and $n_{S_2}$ may be equal to 3, 6, and 12, respectively. These values are selected such that the multipliers in the BDOF process do not exceed 15-bit, and the maximum bit-width of the intermediate parameters in the BDOF process is kept within 32-bit.

Figure 27:
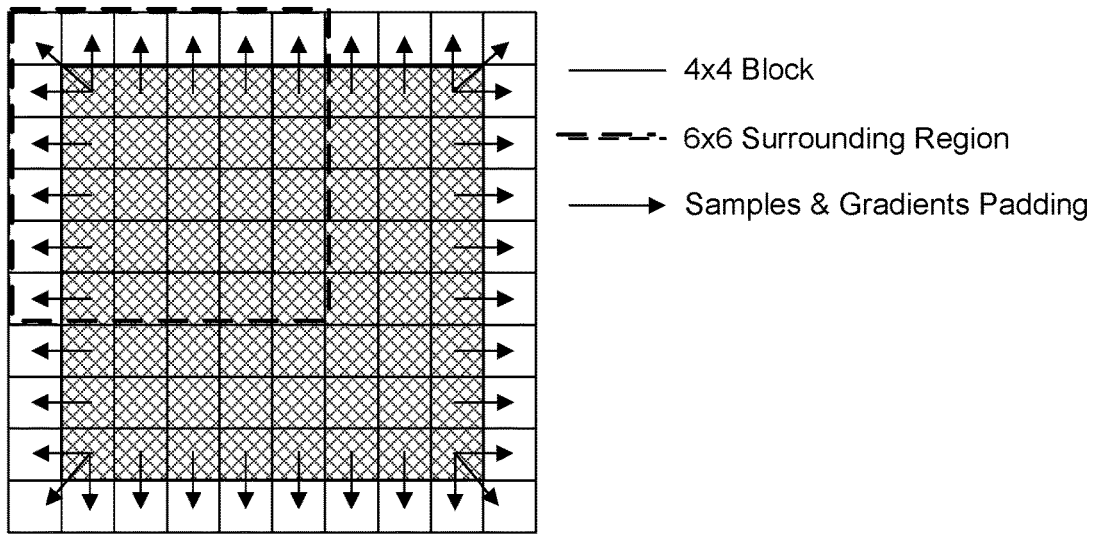
FIG. 27 illustrates an example of an extended CU region used in Bi-directional optical flow.

In order to derive the gradient values, some prediction samples $I^{(k)}(i,j)$ in list k (k=0,1) outside of the current CU boundaries need to be generated. As depicted in FIG. 27, the BDOF uses one extended row/column around the CU's boundaries. In order to control the computational complexity of generating the out-of-boundary prediction samples, bilinear filter is used to generate prediction samples in the extended area (white positions), and the normal 8-tap motion compensation interpolation filter is used to generate prediction samples within the CU (gray positions). These extended sample values are used in gradient calculation only. For the remaining steps in the BDOF process, if any sample and gradient values outside of the CU boundaries are needed, they are padded (i.e. repeated) from their nearest neighbors.

Bi-directional Optical flow (BIO) is sample-wise motion refinement which is performed on top of block-wise motion compensation for bi-prediction. In case of bi-prediction, the goal of BIO is to refine motion for each sample assuming linear displacement in-between the two reference pictures and based on Hermite's interpolation of the optical flow.

The tools described above allow to improve a final prediction used for encoding a block of a picture. However, they also have some drawbacks such as:
 the BDOF correction is computed using correction factor partly on a sub-block basis,
 the BDOF correction is computed using a symmetry assumption of the 2 reference pictures,
 the IC weighting is uniform on the block;
 the Gbi weighting requires a signaling of the weights to apply on the predictions and the weighting is uniform on the block,
 the IC process might need information outside the reference blocks and the current block (reconstructed samples) to compute the final parameters,
 the correction model is quite simple (optical flow based correction, linear illumination changed) and more complex corrections are not handled.

A DNN (Deep Neural Network) is a neural network composed of multiple layers introducing non-linearity and for which parameters have been found by machine learning methods, typically a training on large database of examples.

The present application provides various embodiments for obtaining a prediction for a block, based on the use of Neural Networks.

Notations

In the following, the notation used are as follows:
 X: original data
 $\hat{X}$: reconstructed data (after full decoding process), usually a prediction+a residual error
 $\tilde{X}$: predicted data (using already decoded data)
 $\check{X}$: refined data (using already decoded data)
 $I_k$: image at time k
 $mv_{i \to j}$: motion field from time i to time j (applying a motion compensation using $mv_{i \to j}$ and $I_i$ gives a prediction of $I_j$).

Figure 8A:
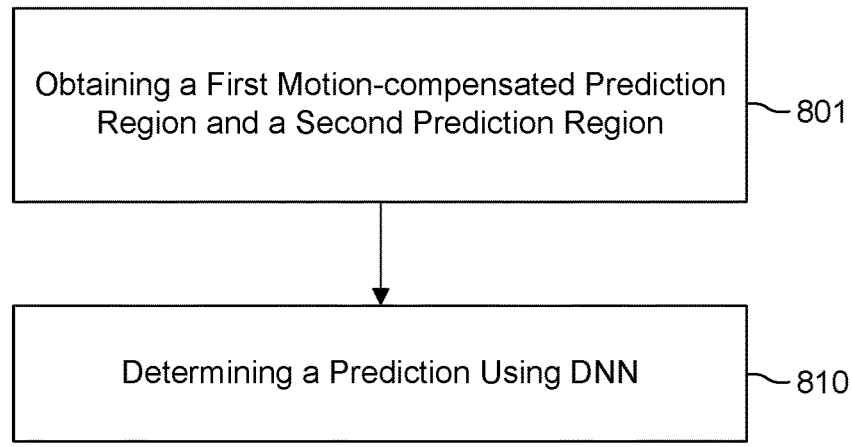
FIG. 8A illustrate an exemplary method for determining a prediction for a block of a picture according to an embodiment.

FIG. 8A illustrates an embodiment of method 800A for determining a prediction for a block of a picture according to an embodiment. A first motion-compensated region for the block and a second region for the block are obtained (801).

A prediction for the block is determined (810) using a Neural Network that uses at least the first motion-compensated region and the second region.

According to an embodiment, the prediction is output by the Neural Network.

According to an embodiment, method 800A for determining a prediction is implemented in the encoder described with FIG. 2 and in the decoder described with FIG. 3.

Various embodiments of method 800A for determining a prediction are described below which can be implemented alone or in combination. Method 800A for obtaining a prediction can take as inputs predictions resulting from bi-directional prediction, or uni-directional prediction.

Figure 8B:
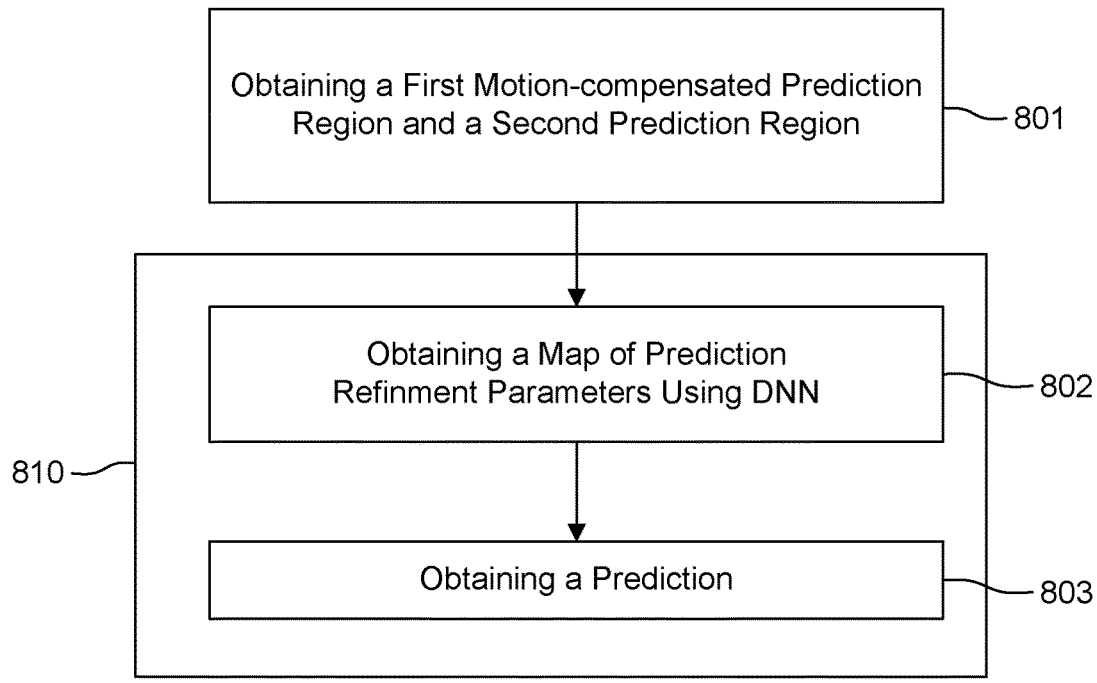
FIG. 8B illustrate an exemplary method for determining a prediction for a block of a picture according to another embodiment.

FIG. 8B illustrates an embodiment of method 800B for obtaining a prediction for a block of a picture according to another embodiment. A first motion-compensated region for the block and a second region for the block are obtained (801).

A map of prediction refinement parameters for the block is obtained (802) using a Neural Network, for instance a Deep Neural Network, that uses the first motion-compensated region and the second region. A prediction for the block is then obtained (803) based at least on the first motion-compensated region and the map of prediction refinement parameters.

According to an embodiment, method 800B for obtaining a prediction is implemented in the encoder described with FIG. 2 and in the decoder described with FIG. 3.

Various embodiments of method 800B for obtaining a prediction are described below which can be implemented alone or in combination. Method 800B for obtaining a prediction can take as inputs predictions resulting from bi-directional prediction, or uni-directional prediction. In the various embodiments, the map of prediction refinement parameters can comprise a set of parameters applied to the bi-directional predictions, or to a prediction resulting from a bi-directional prediction, or a uni-directional prediction. The set of parameters may comprise an offset parameter, or a set of weights, or any combination of weights and offset.

According to the present principles, prediction refinement parameters are thus obtained for deriving a prediction for a block, such parameters are no more uniform on the block. According to an embodiment, the map of prediction refinement parameters is pixel-based. In that case, the output of the Neural Network has a same size as the current block.

According to another embodiment, the map of prediction refinement parameters is subblock-based, i.e. it comprises prediction refinement parameters for sub-blocks of the block. In that case, the output of the Neural Network has a reduced size with respect to the current block. Such embodiment allows having smoother prediction refinement parameters.

In a same way, when the prediction is output by the Neural Network, the prediction can be determined pixel-based or subblock-based. In the latter case, the prediction output by the Neural Network is upsampled to have a same size of the current block.

In the embodiments disclosed above, the second region may be a motion-compensated region for the block, or the second region may be a causal neighborhood of the block, or the second region may comprise the block and a causal neighborhood of the block.

The prediction determined according to any one of the embodiments above can then be used for encoding the block, for instance by determining a residual between the block and the prediction. In order to properly decode the bitstream, the decoder performs the same prediction process as the process at the encoder. The block can thus be reconstructed at the decoder from the residuals, if any, decoded from a bitstream and the prediction. In particular, the same Neural Network structure is used at the decoder side, for example, the same structure is known at the encoder and decoder without signaling.

Deep Prediction Blending

Figure 9:
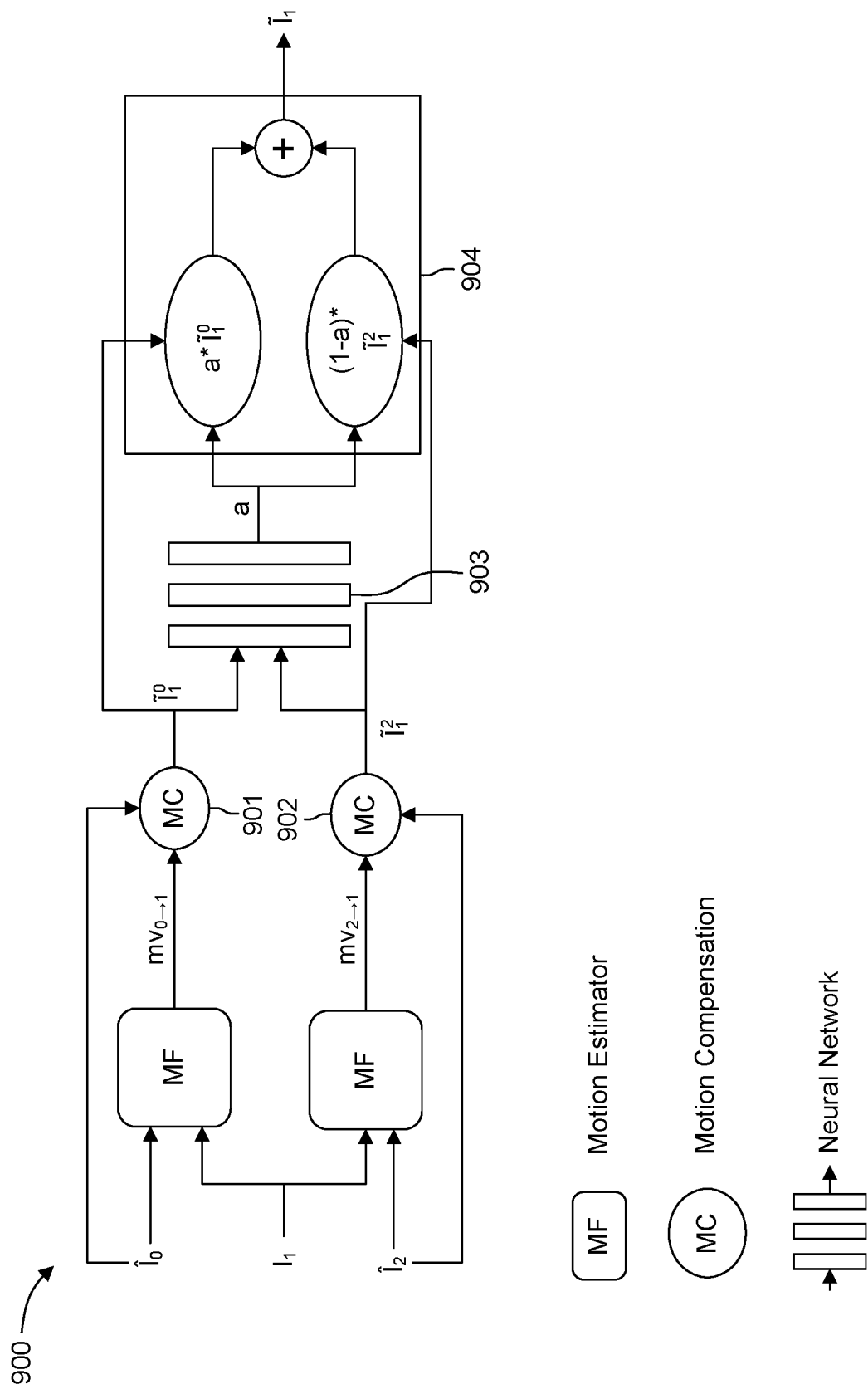
FIG. 9 illustrates a method for weighting parameters derivation using a DNN according to an embodiment.

FIG. 9 illustrates a method 900 for obtained a prediction for a block of a picture according to an embodiment. Method 900 allows for obtaining a prediction for a block of a picture based on weighting or blending parameters derivation using a DNN.

As depicted in FIG. 9, the motion compensated pair of blocks ($\tilde{I}_1^0$ and $\tilde{I}_1^2$) are used as input to a DNN (903) to generate a pixel based weighting map. It is assumed that the current picture to encode is $I_1$, and image $I_0$ (in the past of $I_1$) and image $I_2$ (in the future of $I_1$) have been already coded and reconstructed at decoder side, their respective reconstructed versions being denoted $\hat{I}_0$ and $\hat{I}_2$.

For each block to encode in image $I_1$, when a bi-directional candidate using reference images $\hat{I}_0$ and $\hat{I}_2$ is evaluated, the following process is applied.

At the encoder, a Motion Field (MF) is computed between the current block in $I_1$ and the one in $\hat{I}_0$ in the past (resp. $\hat{I}_2$ in the future), producing a motion field $mv_{0 \to 1}$ (resp. $mv_{0 \to 2}$). This motion can be either uniform (translational model), affine or pixel based. On the decoder side, the motion field $mv_{0 \to 1}$ and $mv_{0 \to 2}$ are respectively decoded from a received bitstream.

According to a variant, the motion field/motion compensated frame can be the output of a decoder side motion refinement/prediction refinement module, either conventional (like DMVR or BDOF in VVC), or DNN-based like the one described in EP20305565.2.

A first and a second motion-compensated prediction blocks for the block in $I_1$ are obtained (901, 902). The 2 predictions are then fed into a Deep Neural Network (903), typically a fully convolutional network, in order to output a weighting block a. The last layer of the network is a clipping layer which clips the value in a given range (for example in [−0.25, 1.25]).

To form the current block bi-directional prediction (904) the prediction block $\tilde{I}_1^0$ and $\tilde{I}_0^2$ with the corresponding weight are added: $a*\tilde{I}_1^0+(1-a)*\tilde{I}_1^2$.

According to the embodiment disclosed herein, there is no need to send weighting parameters between the 2 predictions as the same blending parameters derivation process is applied at the encoder and the decoder. In addition, the blending parameters values are no more limited to a set of predefined values. Thus, compression efficiency is improved.

Exemplary Network Architectures

Figure 10:
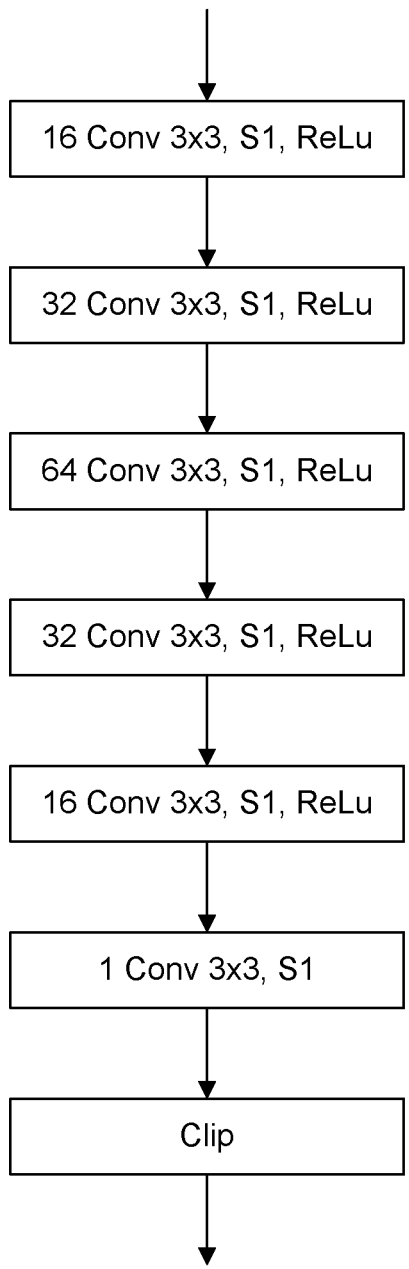
FIG. 10 illustrates an example of a fully convolutional network according to an embodiment.

The neural network used in any one of the embodiments described herein can, for example, be a fully convolutional network like the one depicted in FIG. 10. Input is the 2 predictions concatenated as one tensor.

According to a variant, the predictions can be enlarged, for example using motion padded motion compensation, in order to take into account the width of the receptive field of the network.

Each layer of the DNN is a convolutional layer with an activation function at the end, for instance a ReLu, except for the last convolutional layer which does not have an activation. The layer "N conv K×K, Sj" means N convolution of kernel K×K with a stride of j. The last layer is the clip layer.

According to an embodiment, the map of prediction refinement parameters obtained from the DNN is pixel-based. According to this embodiment, the output of the DNN is a layer of the same size as the input predictions.

Other possible network architectures include, but not exclusively, ResNet based DNN, dense-net etc.

Figure 11:
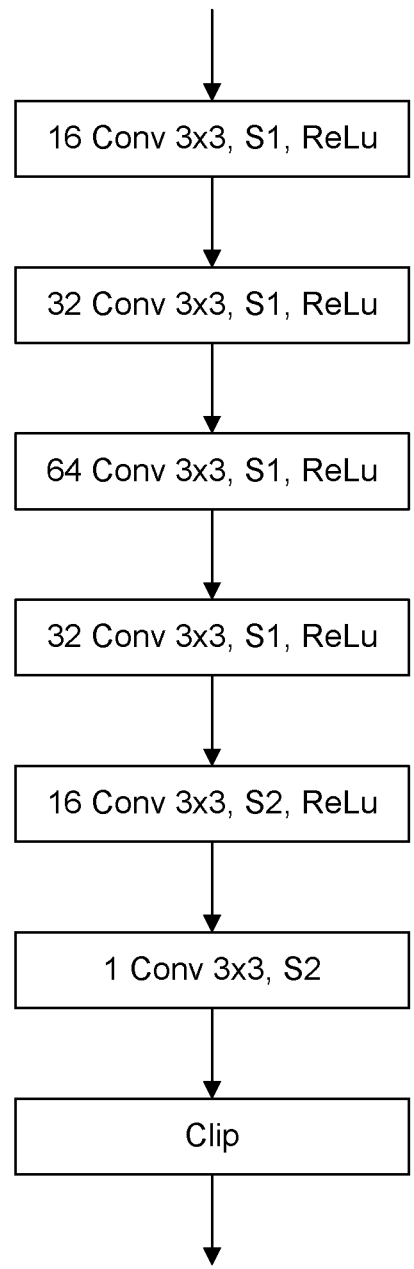
FIG. 11 illustrates another example of a fully convolutional network according to another embodiment.

According to another embodiment, the map of prediction refinement parameters obtained from the DNN is subblock-based. Thus, in order to apply a weight on sub-block (instead of pixel), the last convolutional layers perform a stride of an appropriate value to reduce the size of the output. For example, for a weighting map of 4×4 sub blocks, 2 consecutive strides of 2 are performed as depicted in FIG. 11. Alternatively, pooling layers can be added at the end of the network, for example an average pooling or a max pooling, using the same stride values.

In order to consider motion discontinuities for the blending of the predictions performed in the method 900 described with FIG. 9, according to an embodiment, the motion field can be input to the blending DNN (903).

According to this embodiment, the motion field for each prediction is added to the prediction themselves by concatenating each data into the channels input. In case of sub-block motion field, the motion field can be expanded before being concatenated to the predictions, for instance by repetition.

Figure 12:
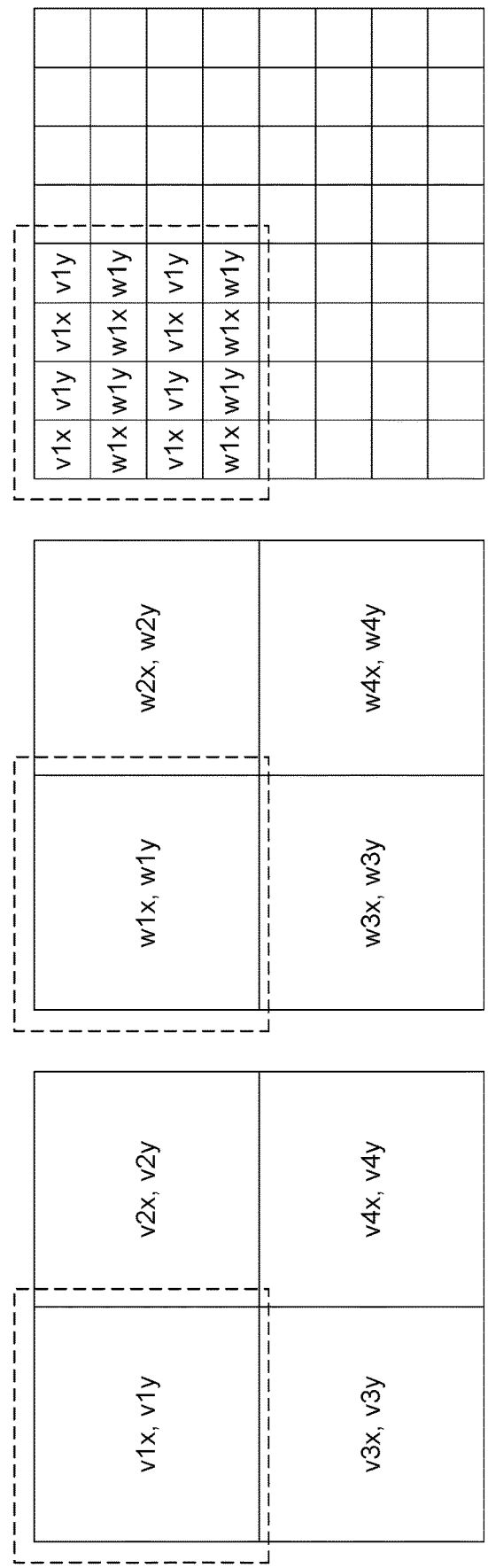
FIG. 12 illustrates a motion field expansion, according to an embodiment.

According to another variant, the sub-block motion field can be interlaced and expanded as depicted in FIG. 12 illustrating a motion field expansion according to an embodiment. On the left and middle of FIG. 12, the 4×4 sub-block-based motion fields are shown: (vx,vy) denotes the motion vectors associated with the first prediction and (wx,wy) denotes the ones associated with the second prediction. For example, in FIG. 12, v1x is the x component of the motion vector for the first 4×4 sub-block coming from $mv_{0 \to 1}$, and $w_1x$ is the x component of the motion vector for the first 4×4 sub-block coming from $mv_{2 \to 1}$...

On the right of FIG. 12, the motion field input of the blending DNN is shown. The top-left corner of the block, corresponding to a 4×4 area in the block, is formed by interlacing the individual components into the 4×4 sub-block, repeating the interlaced pattern in the sub-block. Other interlacing and repeating patterns are possible.

Figures 13, 14:
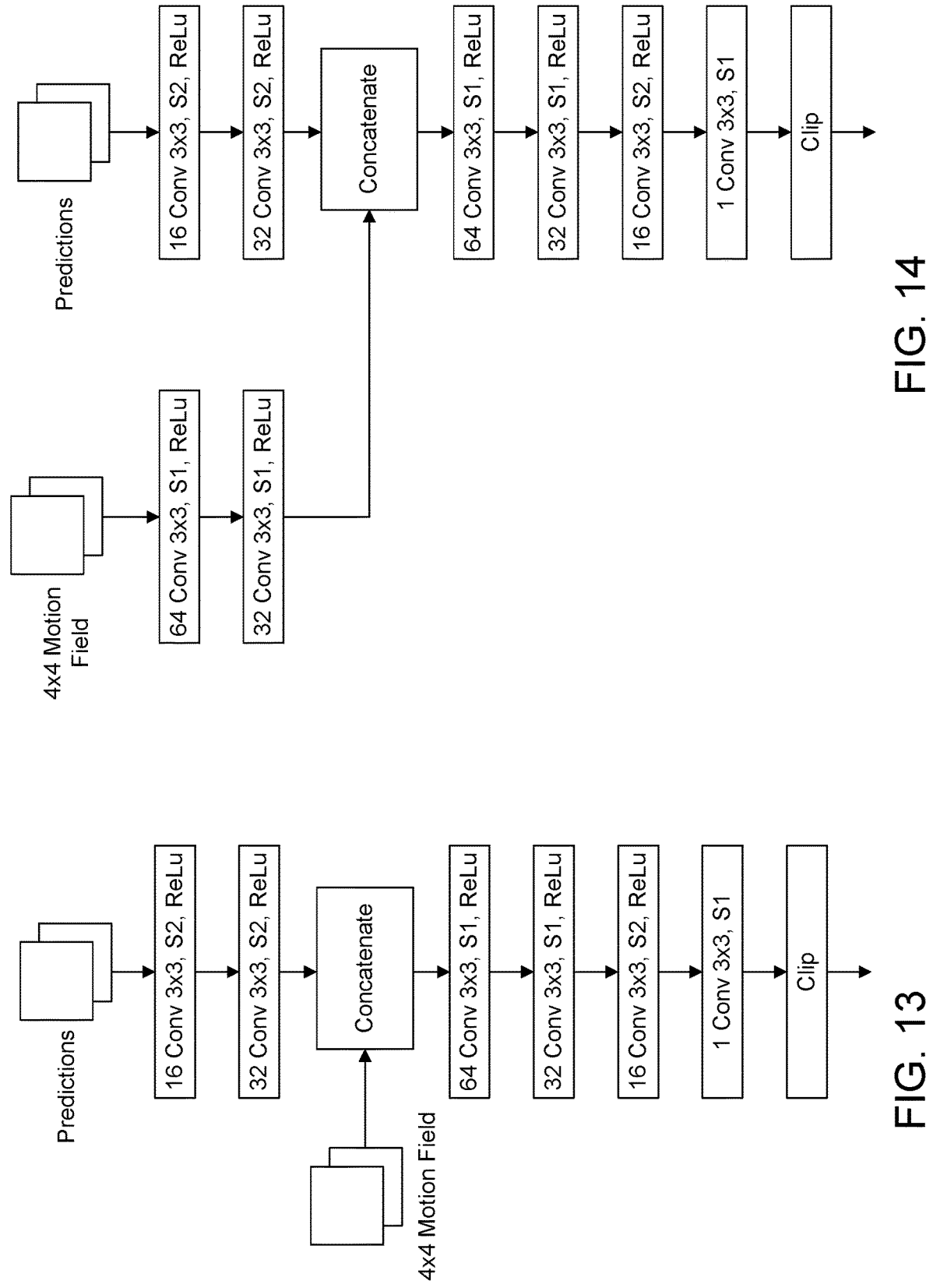
FIG. 13 illustrates exemplary inputs for the method of FIG. 9, according to an embodiment.
FIG. 14 illustrates exemplary inputs for the method of FIG. 9, according to another embodiment.

In a variant, the motion information is fed in the network in an intermediate layer as depicted in FIG. 13. FIG. 13 illustrates a blending DNN and exemplary inputs that can be used for the method of FIG. 9:

The predictions are first input to the network,
After some layers comprising strides or pooling, the spatial resolution of the tensor is equal to the one of the 4×4 motion field, typically after 2 strides of step 2,
The motion fields and the tensor are then concatenated,
The remaining layers of the network use standard convolutional layers combination.

In another variant, the motion field inputs go through at least one convolutional layer before being concatenated with the tensor as depicted in FIG. 14 illustrating a blending DNN and exemplary inputs that can be used for the method of FIG. 9 according to another embodiment.

Deep Prediction Blending Training

The networks described above are trained using prediction blocks, optionally motion field and the ground truth as the current block to reconstruct. The dataset is composed of a large number of such blocks extracted from video sequences.

The DNN network is typically a fully convolutional network or any of variant (resnet, dense net etc.). A loss function is computed based on a mean square error (or any other relevant metric) between the block of the current frame and the reconstructed block using the blended prediction. Other regularization term can also be applied during the training stage, e.g. absolute norm of the weights, motion total variation etc. . . . . .

According to an embodiment, the training process can be done jointly with other Neural Network based prediction enhancement modules.

Figure 15:
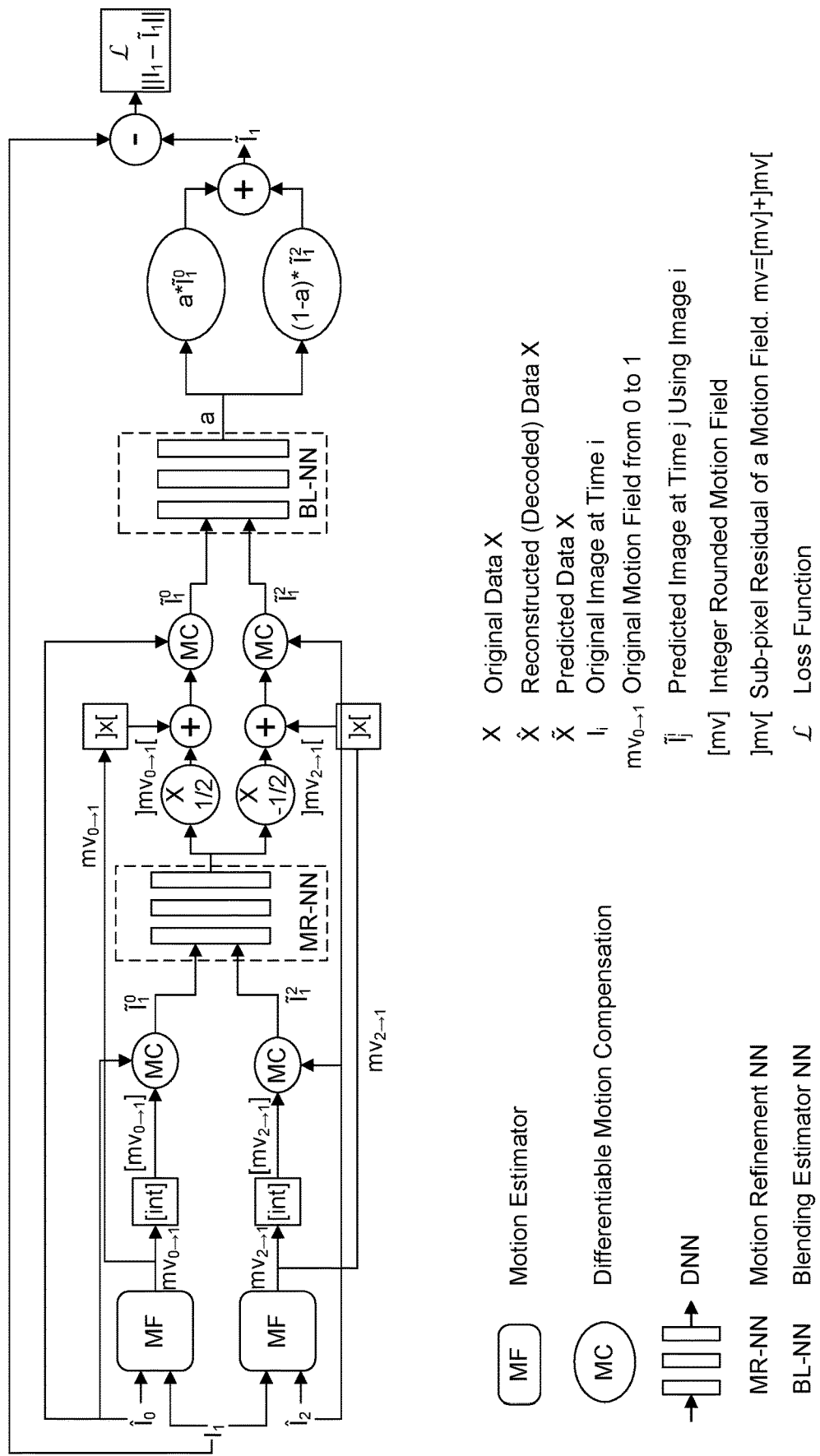
FIG. 15 illustrates a method for obtaining prediction based on motion field refinement DNN and blending prediction DNN, according to an embodiment.

FIG. 15 illustrates a method for obtaining prediction refinement parameters based on motion field refinement DNN and blending prediction DNN, according to an embodiment. FIG. 15 illustrates a joint training with a NN-based decoder side motion refinement module as depicted in EP20305565.2 and the proposed NN-based decoder side prediction blending module according to any one of the embodiments described above.

Original block $I_1$ and reference (reconstructed from previous frame) blocks $\hat{I}_0$ and $\hat{I}_2$ are first used to refine a bi-directional motion field $mv_{0 \to 1}$, $mv_{2 \to 1}$ with a MR-NN module.

The resulting prediction after motion compensation $\tilde{I}_1^0$ and $\tilde{I}_1^2$ are then fed into the prediction blending estimator (BL-NN) to create a map of weights a used to blend the 2 predictions together.

Figure 16:
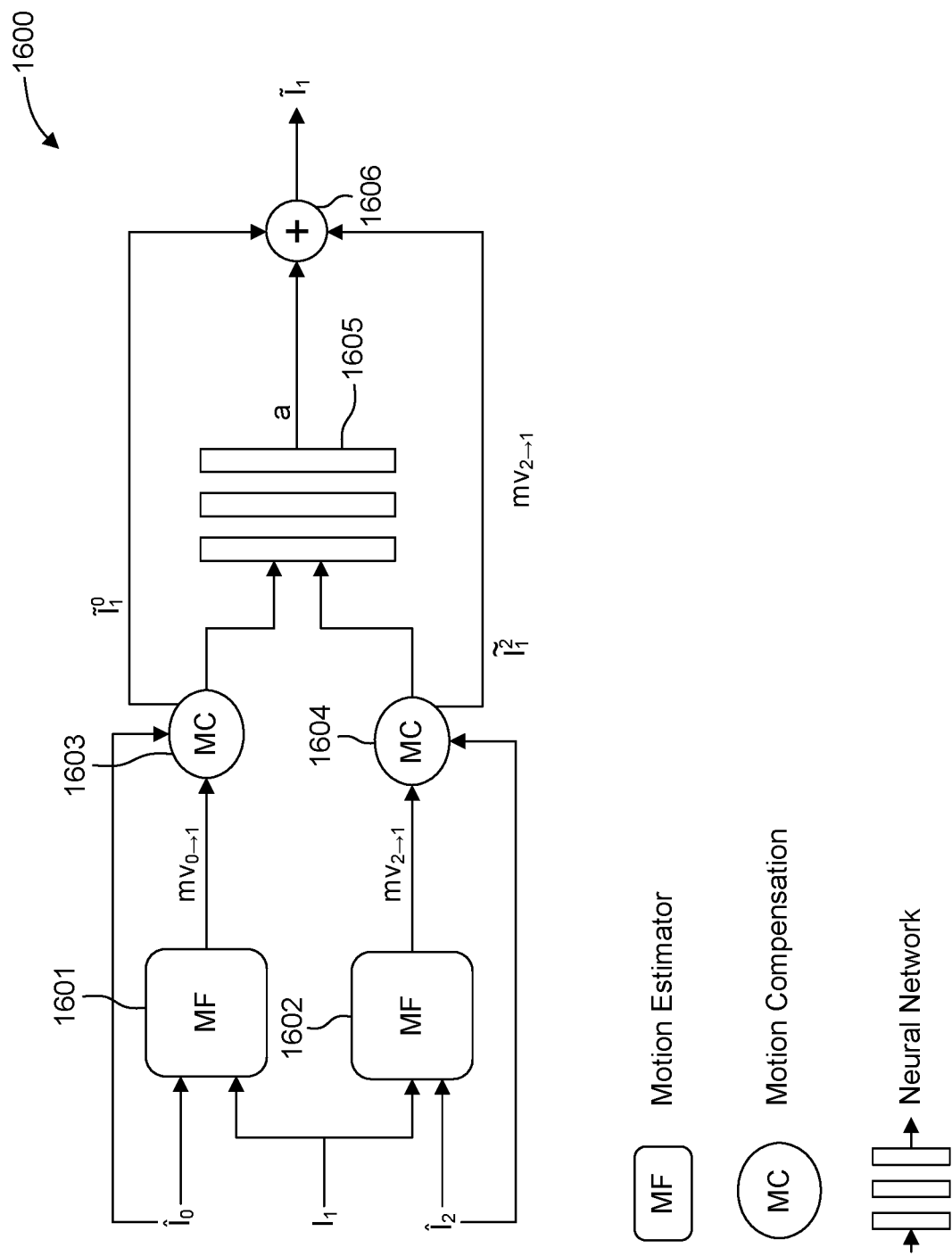
FIG. 16 illustrates a method for illumination compensation parameter derivation, according to an embodiment.

The resulting prediction $\tilde{I}_1$ is then compared to the original block $I_1$ using a loss function $\mathcal{L}$ typically a L1 or L2 norm. $\tilde{I}_1$ Deep Illumination Compensation FIG. 16 illustrates a method 1600 for obtaining a prediction for a block of a picture according to an embodiment. Method 1600 allows for obtaining a prediction for a block of a picture based on illumination compensation parameters derivation using a DNN.

As depicted in FIG. 16, motion compensated pair of blocks ($\tilde{I}_1^0$ and $\tilde{I}_2^0$) are used as an input to a DNN to generate a pixel-based illumination compensation map. It is assumed that the current picture to encode is $I_1$ and that images $I_0$ (in the past of $I_1$) and $I_2$ (in the future of $I_1$) have been already coded and reconstructed at decoder side, yielding the respective reconstructed images $\hat{I}_0$ and $\hat{I}_2$.

For each block to encode in the image $I_1$, when a bi-directional candidate using reference images $\hat{I}_0$ and $\hat{I}_2$ is evaluated the illumination compensation process is used.

At encoder side, a Motion Field (MF) is computed (1601, resp. 1602) between the current image $I_1$ and $\hat{I}_0$ in the past (resp. $\hat{I}_2$ in the future). It produces a motion field $mv_{0 \to 1}$ (resp. $mv_{2 \to 1}$). This motion can be either uniform (translational model), affine or pixel based. On decoder side, the motion field $mv_{0 \to 1}$ (resp. $mv_{2 \to 1}$) is decoded from a received bitstream.

The prediction block $\tilde{I}_1^0$ (resp. $\tilde{I}_2^0$) is then obtained (1603, resp. 1604) from the motion field $mv_{0 \to 1}$ (resp. $mv_{2 \to 1}$) and the reconstructed reference image $\hat{I}_0$ (resp. $\hat{I}_2$).

The motion field/motion compensated frame can be the output of a decoder side motion refinement/prediction refinement module, either conventional (like DMVR or BDOF in VVC), or DNN-based as described in EP20305565.2.

The 2 predictions $\tilde{I}_1^0$ and. $\tilde{I}_2^0$ are then fed into a Deep Neural Network (1605), typically a fully convolutional network in order to output a map a of offsets. Note that the last layer of the network is a clipping layer which clips the value in a given range (for example in [−1.0, 1.0]).

The 2 weighted predictions $\tilde{I}_1^0$ and. $\tilde{I}_2^0$ and the offset are then added (1606) to form the final current block bi-directional prediction $\tilde{I}_1 = \frac{1}{2}(\tilde{I}_1^0 + \tilde{I}_1^2) + a$.

Figure 17:
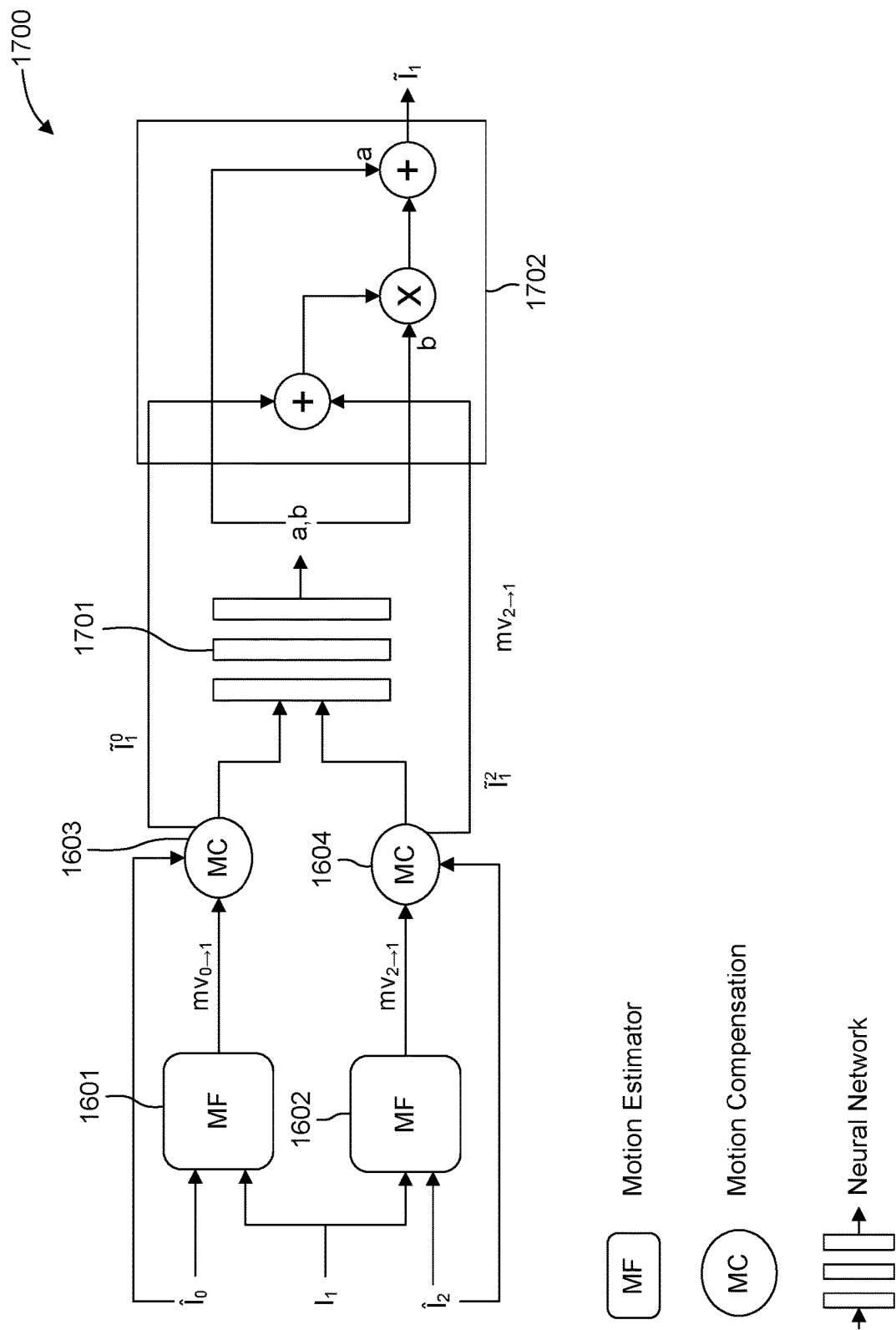
FIG. 17 illustrates a method for illumination compensation parameter derivation, according to another embodiment.

FIG. 17 illustrates a method 1700 for obtaining a prediction for a block of a picture based on illumination compensation parameters derivation using a DNN according to another embodiment.

According to this embodiment, not only an offset but a scaling factor is also applied to the bi-directional prediction. This is an illumination compensation model of order 1. In this case, the output of the network (1701) is a 2-channel tensor, its first and second channels being denoted a and b respectively. In a, an offset is defined for each pixel (resp. sub-block) of the block. In b, a scaling factor is defined for each pixel (resp. sub-block) of the block. The final prediction for the current block is formed (1702) by $\tilde{I}_1 = b\frac{1}{2}(\tilde{I}_1^0 + \tilde{I}_1^2) + a$.

The DNN used in the process described above may have any one of the exemplary network architectures described in relation to FIGS. 10 and 11.

Uni-Prediction Estimation Using Convolutional Network

In a variant, the IC parameters are not computed from the 2 references of a bi-prediction but from a unique prediction. Contrarily to the traditional IC estimator which computes the parameters on a L-shape, according to the present principles, the DNN used are the same as the DNN described above with the following differences:
- One input is the block in the current encoded/decoded frame, enlarged on top and left (i.e. in the causal part of the block). A binary mask associated with the input covers the available samples in the original block. These available samples correspond to the neighboring samples in the L-shape of the current block. The samples inside the current block are not available, since they are not available on the decoder side.
- The other input is the reference block, i.e. the prediction block resulting from motion compensation using the reference image and the motion field of the current block to encode/decode.

Figure 18:
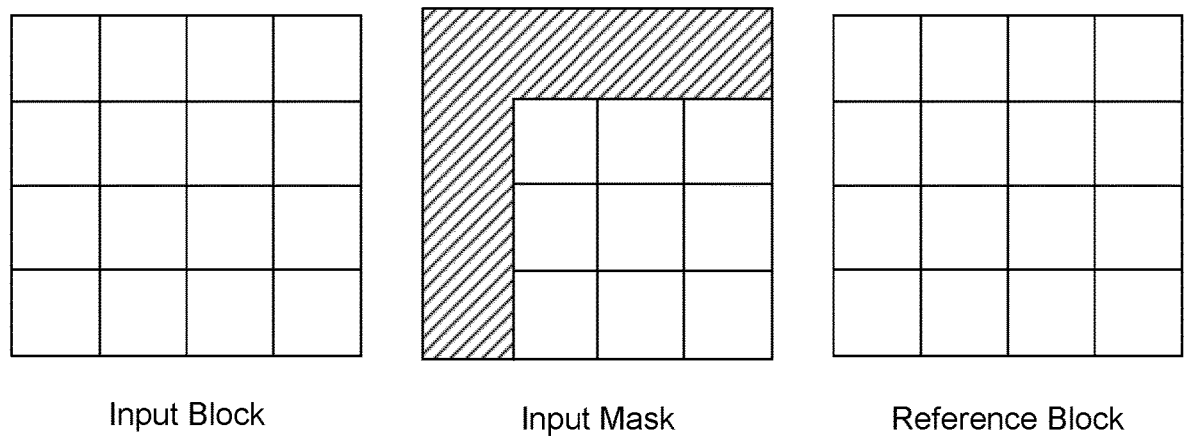
FIG. 18 illustrates exemplary inputs for an illumination compensation estimator for uni-prediction, according to an embodiment.

These inputs are illustrated on FIG. 18. The network is changed by replacing the standard convolution by convolution with masking where availability of an input sample is taken into account during the convolution steps. In this case, the samples of the final tensor which are invalid are padded from the valid values.

Figure 19:
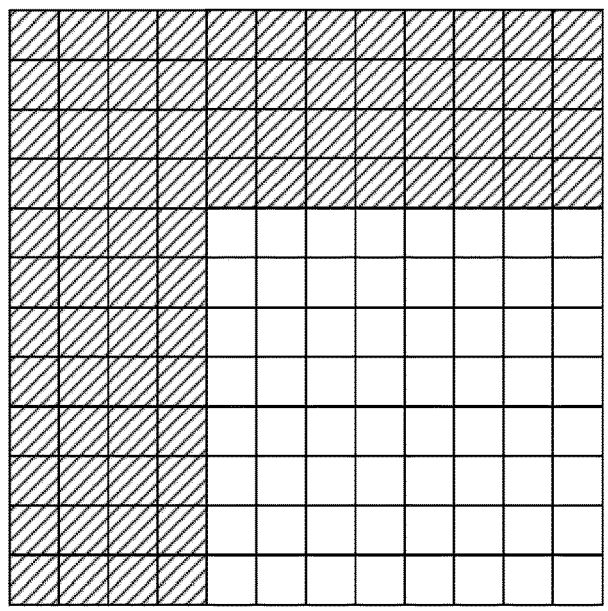
FIG. 19 illustrates exemplary views of a tensor shape across a network in the case of uni-prediction, according to an embodiment.
Figure 19:
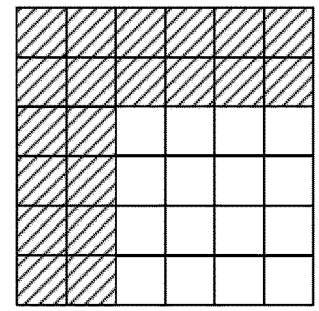
Figure 19:
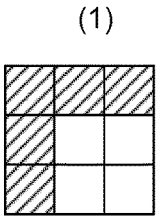
Figure 19:
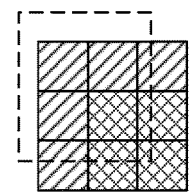
Figure 19:
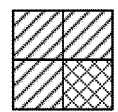
Figure 19:
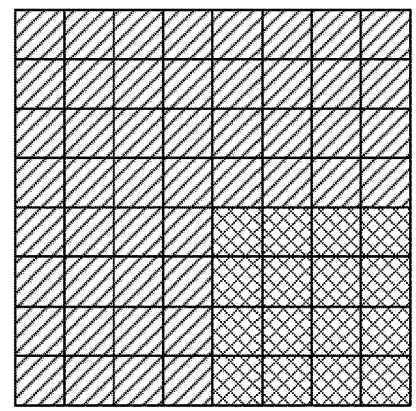

FIG. 19 shows the tensor shape across the network when masking is used (the depth of the tensor is not shown) and valid samples are shown in grey:
(1) shows the original tensor, valid samples in grey,
(2) shows the tensor after applying a stride or pooling layer to the tensor at some points of the convolutional network,
(3) shows the tensor after applying a second stride or pooling layer to the tensor at some other points of the convolutional network,
(4) shows a padding the valid tensor values in the non-valid tensor values,
(5) shows extraction of the top left corner of the final tensor,
(6) shows expansion of the tensor to the original block size. Expansion can be done by simple repeat or can be done by learnt deconvolution, similarly to an auto-encoder principle.

Uni-Prediction Estimation Using Non Convolutional Network

Figure 20:
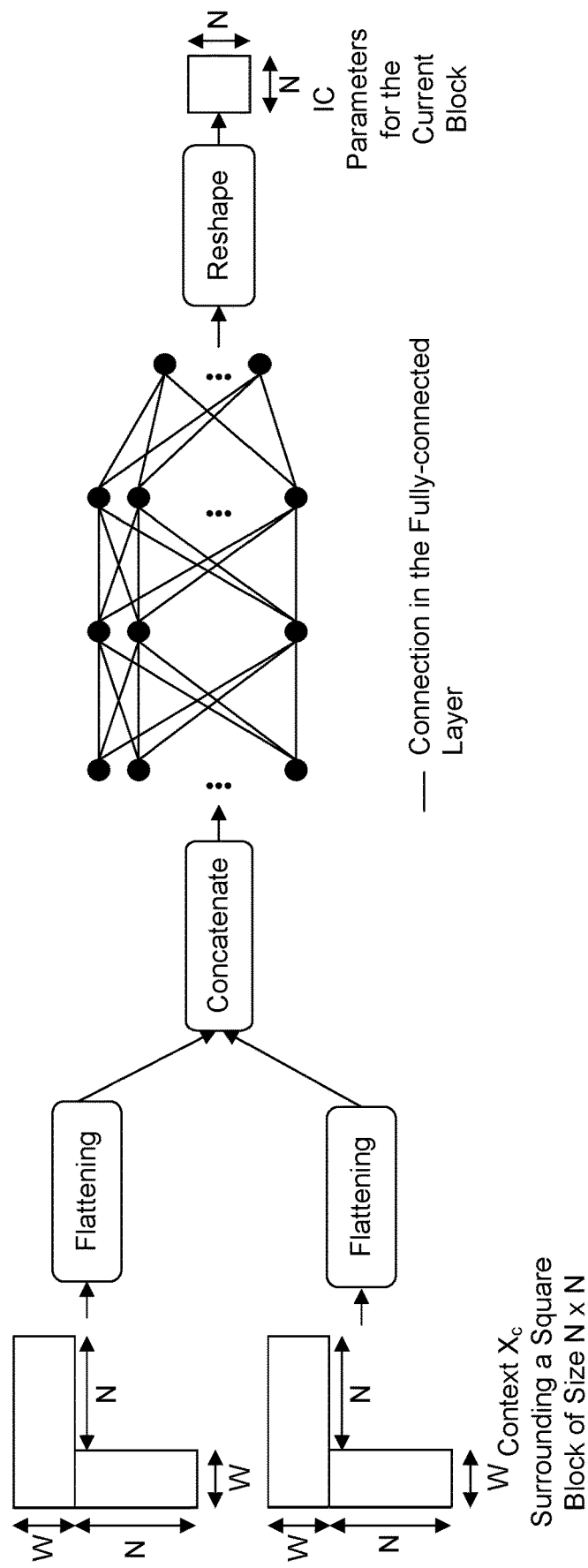
FIG. 20 illustrates a method for illumination compensation parameter derivation, according to another embodiment.

In another variant, the convolutional network is replaced by a network including fully connected layers. FIG. 20 shows an example of such a network. First, the surrounding $X_c$ (here of width W) around the current block and the displaced block in the reference image are flatten into 2 vectors. The vectors are concatenated, and the concatenated vector is then input into fully connected layers. The final layer output is then reshaped to the block size (here of size N×N pixels) and appropriate depth depending on the number of parameters in the IC estimator.

Other variants include to perform standard convolution layers before the flattening stage, dimension reduction via strides/pooling etc. . . .

Joint Prediction Refinement

Figure 21:
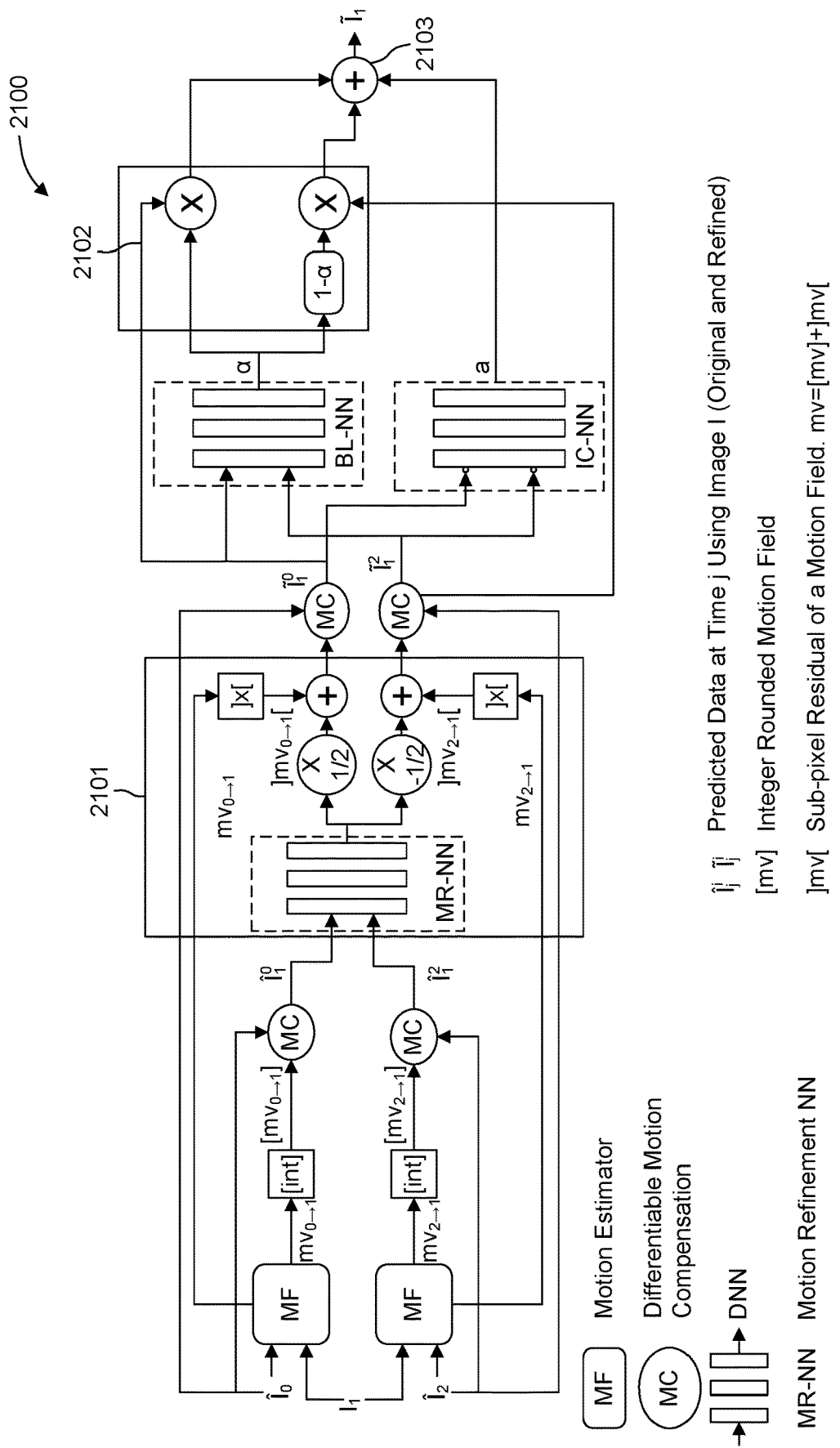
FIG. 21 illustrates a joint decoder side prediction refinement process, according to an embodiment.

The illumination change estimator described above can be used jointly with other decoder side prediction refinement. FIG. 21 illustrates a joint decoder side prediction refinement process 2100, according to an embodiment. Input of the process 2100 are reference frames $\hat{I}_0$ and $\hat{I}_2$ as well as blocks from current frame $I_1$ to be encoded/decoded.

From an initial bi-motion $mv_{0\to1}$ and $mv_{2\to1}$ (either estimated on the encoder side, or decoded from a bitstream on the decoder side), a DNN motion refinement module (MR-NN) performs a sub-block/pixel motion refinement as described in EP20305565.2 for instance. A refined motion field is thus obtained (2101). This refined motion is used to produce predictions $\tilde{I}_1^0$ and $\tilde{I}_1^2$ by motion-compensating of the previously reconstructed images $\hat{I}_0$ and $\hat{I}_2$.

The 2 predictions $\tilde{I}_1^0$ and $\tilde{I}_1^2$ feed 2 networks:
One to estimate a blending factor α to apply on each prediction (BL-NN network)
One to estimate an illumination correction to apply on the final prediction (IC-NN network). Here it is assumed a simple offset a, but in other variants, the network can output other higher order model (see linear model above as an example).

According to the embodiment described here, two maps (α, a) of prediction parameters are thus obtained by the joint prediction refinement process 2100. The 2 predictions $\tilde{I}_1^0$ and $\tilde{I}_1^2$ are blended using the α factor (2102) and the offset a is added (2103) to form the final prediction $\tilde{I}_1$ for the current block.

In a variant, the 2 networks BL-NN and IC-NN are merged into a single network where all parameters are output in the output channels. According to this variant, a single map of prediction parameters is obtained comprising a blending parameter and IC parameters. The estimated parameters then become α, β for an order 0 model, with the final prediction being in the form:

$$\tilde{I}_1 = \alpha \tilde{I}_1^0 + (1-\alpha)\tilde{I}_1^2 + \beta$$

It means that the output tensor has a depth of 2. In this case, both the α, β parameters and the final results are clipped.

Figure 22:
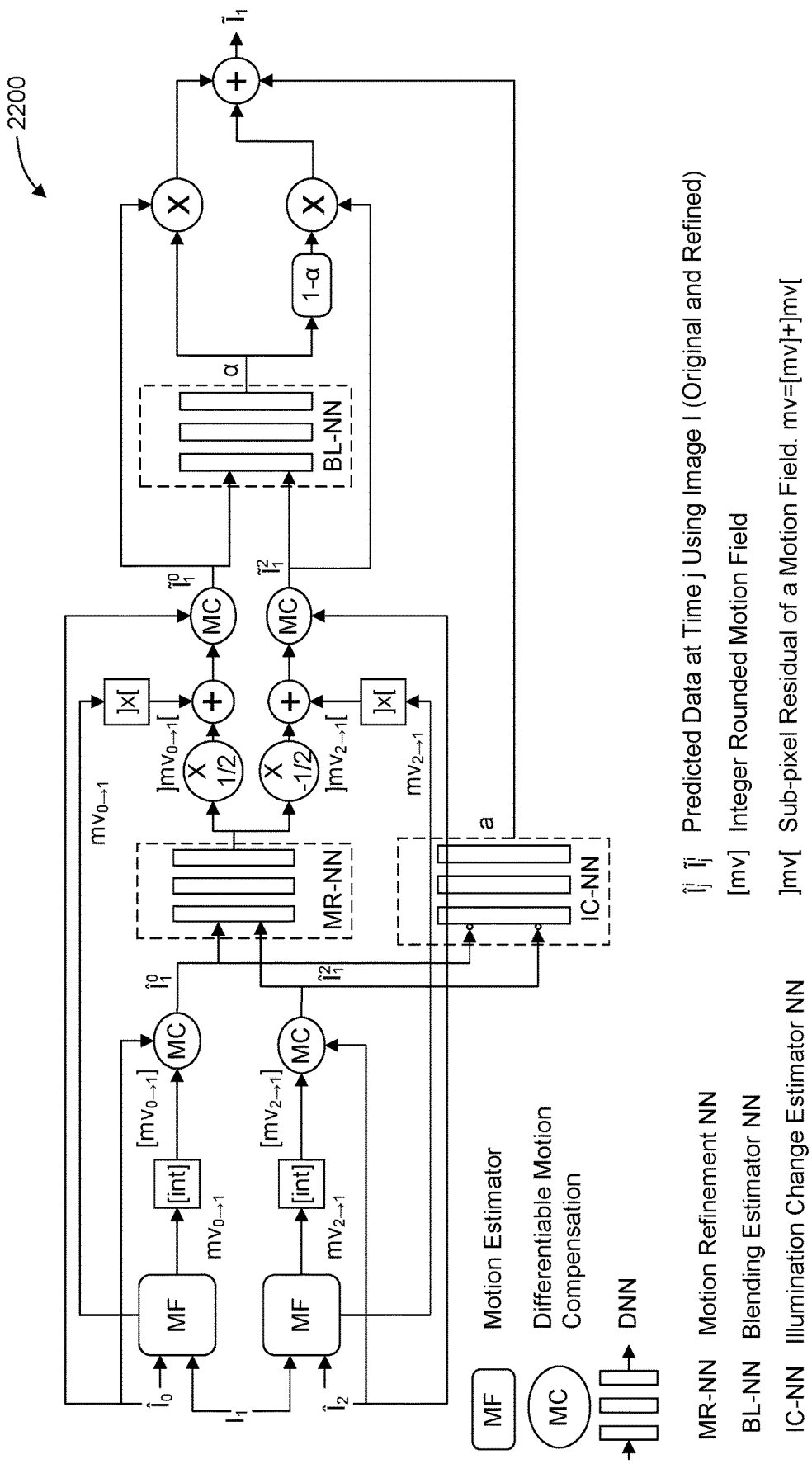
FIG. 22 illustrates a joint decoder side prediction refinement process, according to another embodiment.

FIG. 22 illustrates a joint decoder side prediction refinement process 2200, according to another embodiment. In this variant, in order to increase parallelism, the IC-NN network is computed in parallel with the MR-NN module. FIG. 22 shows an exemplary integration of the IC-NN module in parallel of the MR-NN module.

According to this variant, the IC-NN network uses the same input as the MR-NN module. As in the previous embodiment of the joint prediction refinement, the output of the IC-NN module is then used at the end when computing the final prediction.

In a variant, the 2 networks IC-NN and MR-NN are merged into a single network where all parameters are output in the output channels (motion fields and IC parameters γ). The motion fields output from the merged network MR-NN and IC-NN are then used to produce $\tilde{I}_1^0$ and $\tilde{I}_1^2$ which are then used by the BL_NN network.

The estimated parameters then become α, β, γ for an order 1 model, with the final prediction being in the form:

$$\tilde{I}_1 = \alpha \tilde{I}_1^0 + \beta \tilde{I}_1^2 + \gamma$$

It means that the output tensor has a depth of 3, the α, β parameters being output by the BL-NN network. In this case, the α, β, γ parameters and the final results are clipped.

Joint prediction refinement allows for taking into account the correction brought by the IC module during the motion field refinement, and/or the prediction blending. Thus, compression efficiency is improved as the training of all the network modules takes into account all the prediction refinement that may be applied to obtain the final prediction for a block.

Receptive Field and Module Input Size

As the different modules (MR-NN, BL-NN, IC-NN) described above are based on convolutional networks, samples outside of the blocks are used during the convolution stage. Two typical approaches are usually used:

- Assuming some values outside the input blocks (typically 0 or a padded value),
- Reducing the size of the output in order to keep only valid output samples (i.e. samples which were computed using only input samples inside the input blocks).

According to an embodiment, as the inputs are coming from frames (reference frames and original frame), the input block is enlarged in order to take into account the receptive field of the whole prediction refinement process. This can be done in any one of the embodiments described above.

For instance, assuming the full process shown in FIG. 21 and individual networks having the architecture described in FIG. 10, the input block size can be set as follow:

- an original input block size is assumed to be of W×H, the output prediction size should then be of size W×H.
- in order for the BL-NN and IC-NN to output only valid samples, the input block size should be (W+N)×(H+N) where N is the half receptive field of the network. Assuming a network as described in FIG. 10, the receptive field is 13 samples (6 successive convolutions 3×3 without stride), so N=6.
- in order for MR-NN to output only valid samples, the input block size should be (W+N+M)×(H+N+M) where M is the half receptive field of the network. Assuming the same network as above M=6, so the input blocks size of the whole process should be (W+N+M)×(H+N+M)=(W+12)×(H+12),
- at the end, only the central part of the output is valid and used.

Signaling

In other embodiments, the prediction process according to any one of the embodiments described above or below is performed if one or more of the following conditions are satisfied. Because both the encoder and decoder can check whether the conditions are met, no signaling is needed to indicate whether the prediction process is enabled.

- The block size is less or more than a given threshold. For example, height and width are greater than or equal to 16. Other values for the threshold are also possible.
- The motion amplitude is less or more than a given amplitude.
- The condition can be based on the block content in the reference images, for instance, the block energy is less or more than a give threshold.

According to the VVC standard, the BDOF prediction refinement process only applies when the 2 reference blocks are located temporally symmetrically with respect to the current frame, i.e. the POC (Picture Order Count) distance between the current frame and the reference picture of L0 is the same as the difference between the reference picture of L1 and the current frame. According to the present principles, this constraint can be removed in any one of the embodiments described above or below.

According to a variant, in any one of the embodiments described above and below, a single neural network is used for all cases, i.e. whatever the temporal distance of the reference pictures with respect to the current frame is.

According to another variant, in any one of the embodiments described above and below, a specific neural network is learned and used depending on the temporal distance ratio determined from the temporal difference between the current frame and the reference picture of L0 and the temporal difference between the reference picture of L1 and the current frame.

According to another embodiment, a Symmetric Motion Vector Difference mode of VVC (SMVD) which is used in the AMVP (Advanced Motion Vector Prediction) mode of VVC can also be used together in any one of the embodiments described above and below. In the VVC standard, when using the BDOF prediction refinement, the SMVD mode is deactivated. The SMVD mode is a mode wherein reference pictures used for predicting a block of the current picture are not signaled to the decoder. Instead, reference pictures from the reference picture lists L0 and L1 are used with the reference pictures being temporally symmetric with respect to the current picture. Also, only the motion vector for one of the reference picture is signaled, while the motion vector for the other reference picture is set to be an opposite motion vector. According to this variant, in any one of the embodiments described above and below, motion-compensated pair of blocks ($\tilde{I}_1^0$ and $\tilde{I}_2^0$) used for determining the prediction for the current block can be derived using this SMVD mode.

In another variant, the conditions on motion amplitude or block energy only apply to the MR-NN and BL-NN networks, while the IC-NN network only uses the block-size condition.

Alternatively, a flag is sent to the decoder at the block level, or CTU level or slice level, in order to indicate whether to activate the prediction refinement or not. Such a flag could be sent to enable/disable the whole prediction refinement networks (MR-NN, BL-NN, IC-NN), or a separate flag could be sent to enable/disable each network separately.

Deep Illumination Compensation Training

The above networks are trained using prediction blocks, optionally motion field and the ground truth as the current block to reconstruct. The dataset is composed of a large number of such blocks extracted from video sequences.

A loss function is computed based on a mean square error (or any other relevant metric) between the block of the current frame and the reconstructed block using the final prediction. Other regularization term can also be applied during the training stage (absolute norm of the weights, motion total variation etc.).

Joint Deep Prediction Refinement Training

The training process of BL-NN or IC-NN described above can be done jointly with other NN based prediction enhancement modules.

Figure 23:
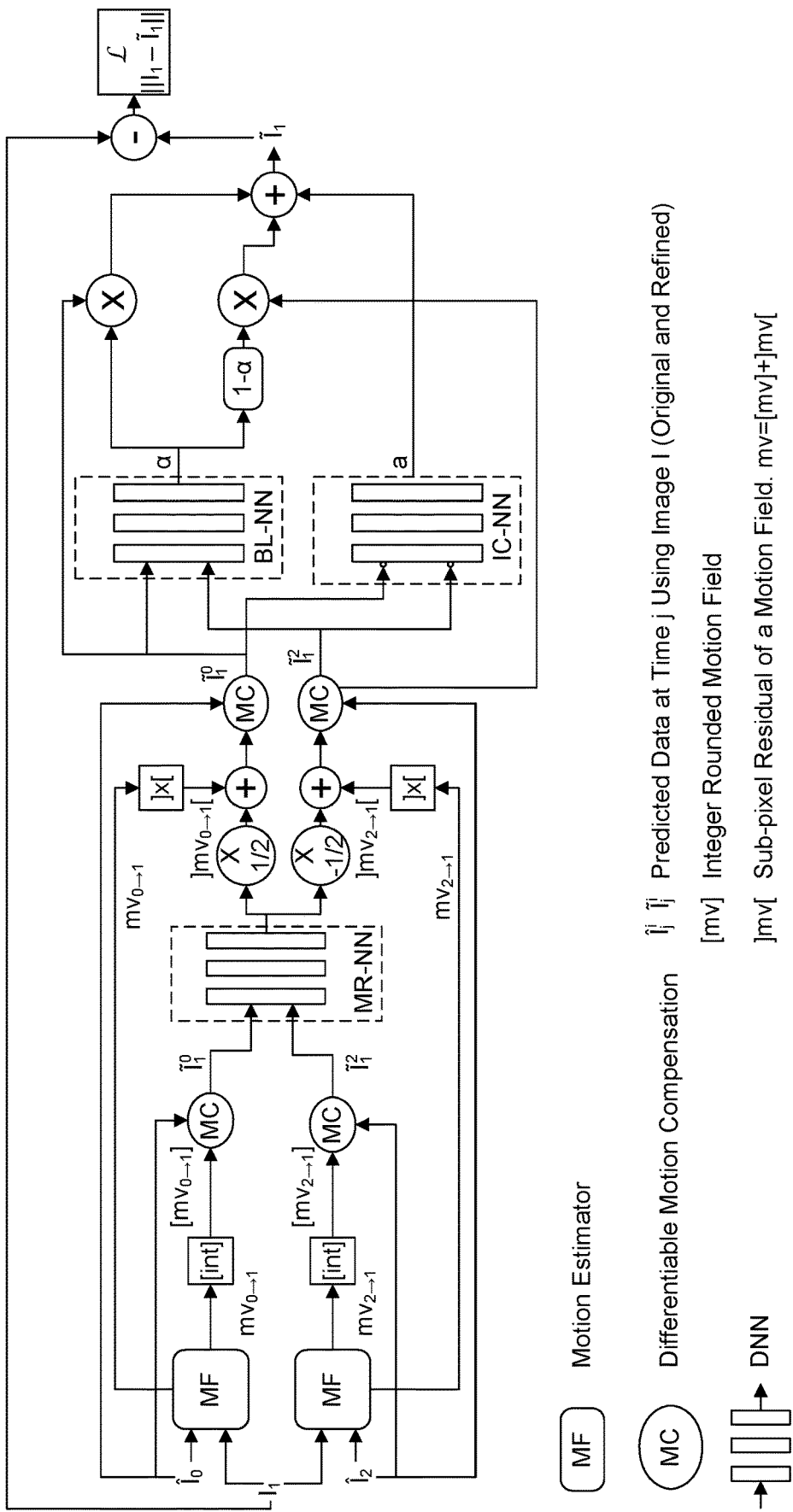
FIG. 23 illustrates a joint training of DNN-based motion refinement and DNN-based prediction refinement processes, according to an embodiment.

FIG. 23 shows a joint training with a NN-based decoder side motion refinement module (MR-NN) as depicted in EP20305565.2, a blending estimator (BL-NN) according to any one of the embodiments described above and an IC network (IC-NN) based decoder side prediction according to any one of the embodiments described above. The resulting prediction $\tilde{I}_1$ is compared to the original block $I_1$ using a loss function $\mathcal{L}$ typically a L1 or L2 norm.

In the above, the prediction process is performed block by block as the current video standards are usually block based. However, the present embodiments can be applied to a region that has a shape that is different from rectangular or square, as the DNN can be trained and implemented for other shapes, or can be a fully convolutional network, hence independent of the region shape or size.

Other Embodiments for Blending and Correction Prediction

Figure 28:
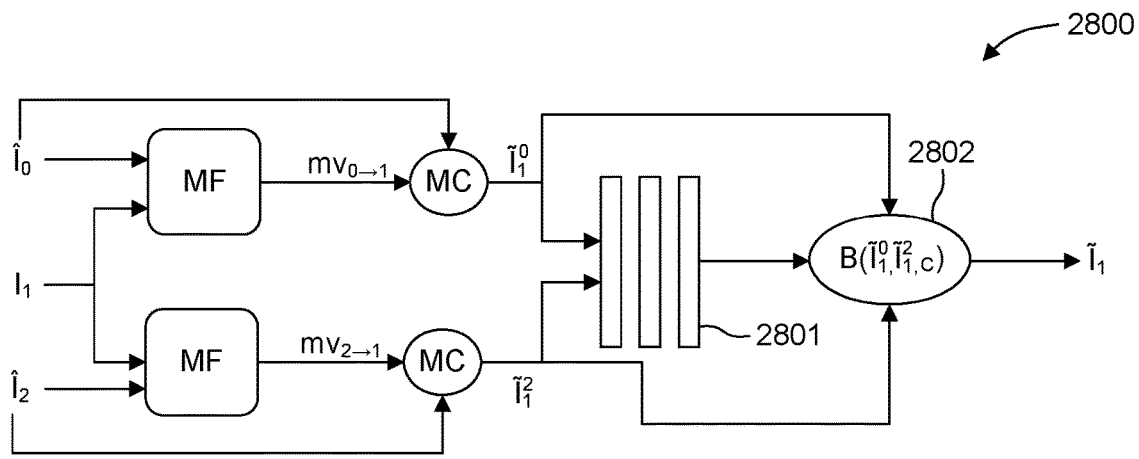
FIG. 28 illustrates a method for deriving blending prediction parameters, according to an embodiment.

FIG. 28 illustrates a method for deriving blending prediction parameters, according to an embodiment. As depicted in FIG. 28, motion-compensated pair of blocks ($\tilde{I}_1^0$ and $\tilde{I}_2^0$) are used as an input of a DNN to generate the final prediction $\tilde{I}_1$. According to the embodiment described here, the blending and correction parameters are determined by a single network.

It is assumed that the current picture to encode is $I_1$ and that images $I_0$ and $I_2$ have been already coded and reconstructed at the decoder side, yielding the respective reconstructed images $\hat{I}_0$ and $\hat{I}_2$. For each block to encode in the image $I_1$, when a bi-directional candidate using reference images $\hat{I}_0$ and $\hat{I}_2$ is evaluated, the process is used.

A Motion Field (MF) is computed between the current image $I_1$ and $\hat{I}_0$ in the past (resp. $\hat{I}_2$ in the future). It produces a motion field $mv_{0 \to 1}$ (resp. $mv_{2 \to 1}$). This motion can be either uniform (translational model), affine or more complex. Advantageously, the motion field/motion compensated frame can be the output of a decoder side motion refinement, either conventional (like DMVR), or DNN-based.

Figure 30:
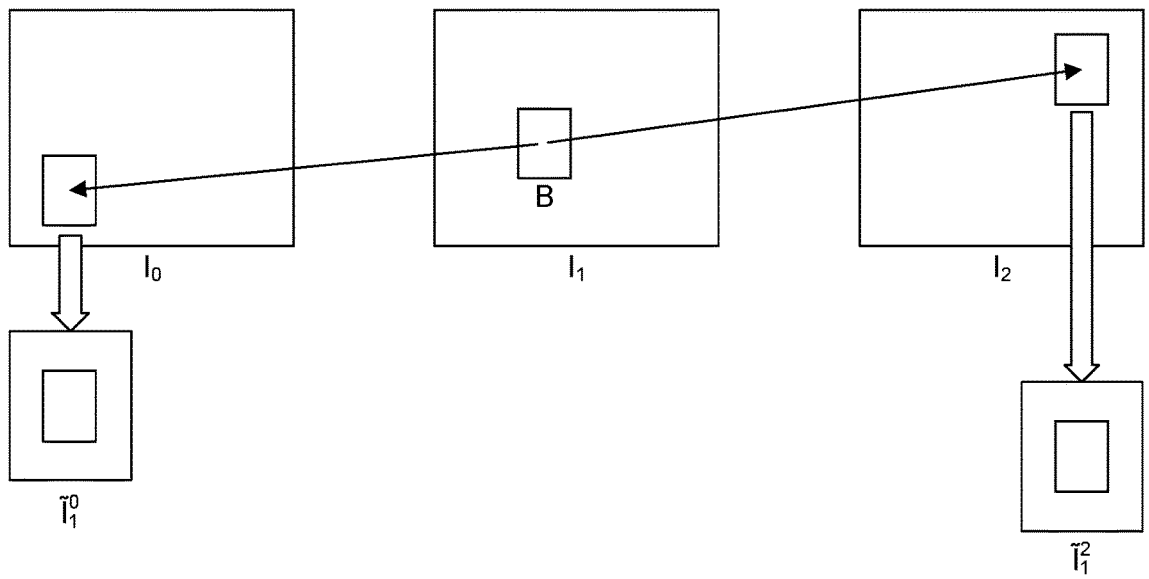
FIG. 30 illustrates an example of input reference enlarged block creation.

According to an embodiment, the 2 predictions use an enlarged block in order to manage the receptive field of the NN and are then fed into a Deep Neural Network (2801), typically a fully convolutional network. FIG. 30 shows an example of a bi-prediction block using a past reference frame $I_0$ and a future reference frame $I_2$. In the 2 reference frames, an enlarged block (compared to the original block B) is extracted to feed the NN. The last layer is typically a clipping layer to ensure that the correction parameters kept the correction small on the final prediction.

The NN 2801 outputs a map of prediction parameters c[i], with being an integer. Then, at 2802, the prediction B ($\tilde{I}_1^0$, $\tilde{I}_1^2$,c) is determined from the map of prediction parameters and the motion-compensated blocks $\tilde{I}_1^0$ and $\tilde{I}_1^2$.

According to a variant, the NN outputs 2 values c[0] and c[1] for each pixel or sub-block and the final prediction is computed as $$B(\tilde{I}_1^0, \tilde{I}_1^2, c) = c[0] + (0.5 + c[1])(\tilde{I}_1^0 + \tilde{I}_1^2 + 1) \quad [eq. 1]$$

The parametrization using (0.5+c[1]) allows to control the maximum scaling factor applied on the blended prediction.

According to another variant, the NN outputs 3 terms instead of 2, using the same centered normalized inputs et centered correction factors:

$$B(\tilde{I}_1^0, \tilde{I}_1^2, c) = c[0] + (0.5 + c[1])(\tilde{I}_1^0 + 0.5) + (0.5 + c[2])(\tilde{I}_1^2 + 0.5)$$

Figure 29:
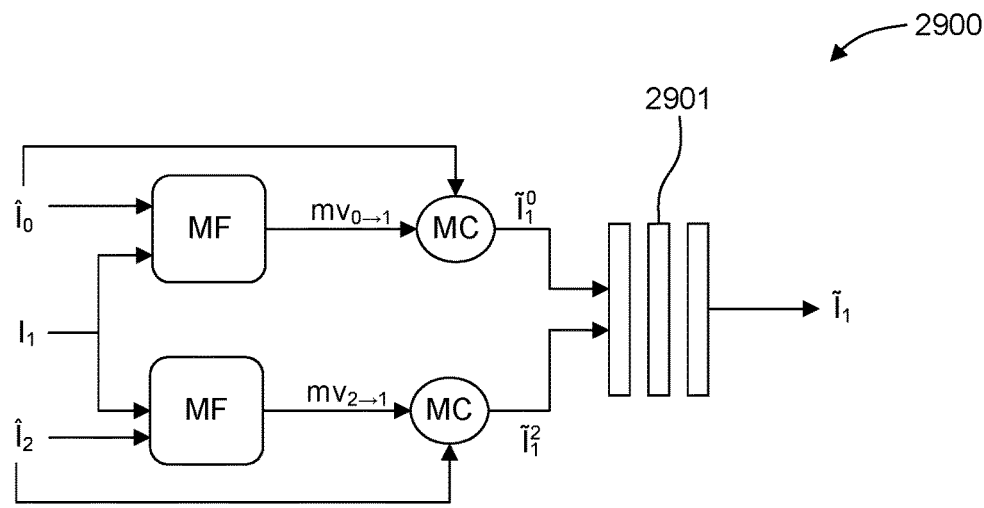
FIG. 29 illustrates a method for determining a blended prediction block, according to an embodiment.

FIG. 29 illustrates a method for determining a blended prediction block, according to another embodiment. According to this embodiment, the NN (2901) outputs directly the prediction block determined from the motion-compensated blocks $\tilde{I}_1^0$ and $\tilde{I}_1^2$ provided as inputs to the NN. According to this embodiment, the blending operation (2802 of FIG. 28) is removed and the last convolutional layer of the NN (not the clip layer) directly outputs the prediction. In this case, the final clip layer clips the value in the range [0,1] (or [0, $2^b$[ with b being the bit depth in case of a quantized NN).

Input and Output Normalization

According to an embodiment, the NN used in the methods described above use normalized centered data. Inputs of the NN use zero centered values. The coefficients are expressed to be zero centered.

According to an embodiment, the motion-compensated blocks used as input to the network are obtained at a first bit depth, which is higher than a second bit depth that is used for storing these motion-compensated blocks. In this embodiment, the motion-compensated blocks are provided to the neural network at a bit depth higher than the second bit depth, for instance at the first bitdepth.

The prediction images $\tilde{I}_1^0$ and $\tilde{I}_1^2$ are normalized and centered using the internal bitdepth of the motion compensated references. For example, in VVC, internal bitdepth of motion compensated reference blocks is 14 bits for 10 bits internal bitdepth (aka main10 profile). This means that the bitdepth for representing the picture to be encoded is 10 bits, while motion compensation is performed using data represented on a higher bitdepth (14 in the main10 profile).

The reference samples are also centered by subtracting $2^{13}$ to the samples. The NN advantageously uses these centered inputs, while outputting the non-centered prediction samples (as depicted on FIG. 31). During the blending stage described above, the normalized offset value (0.5) is added to each prediction, giving the final offset value of 1 in eq.1.

Figure 31:
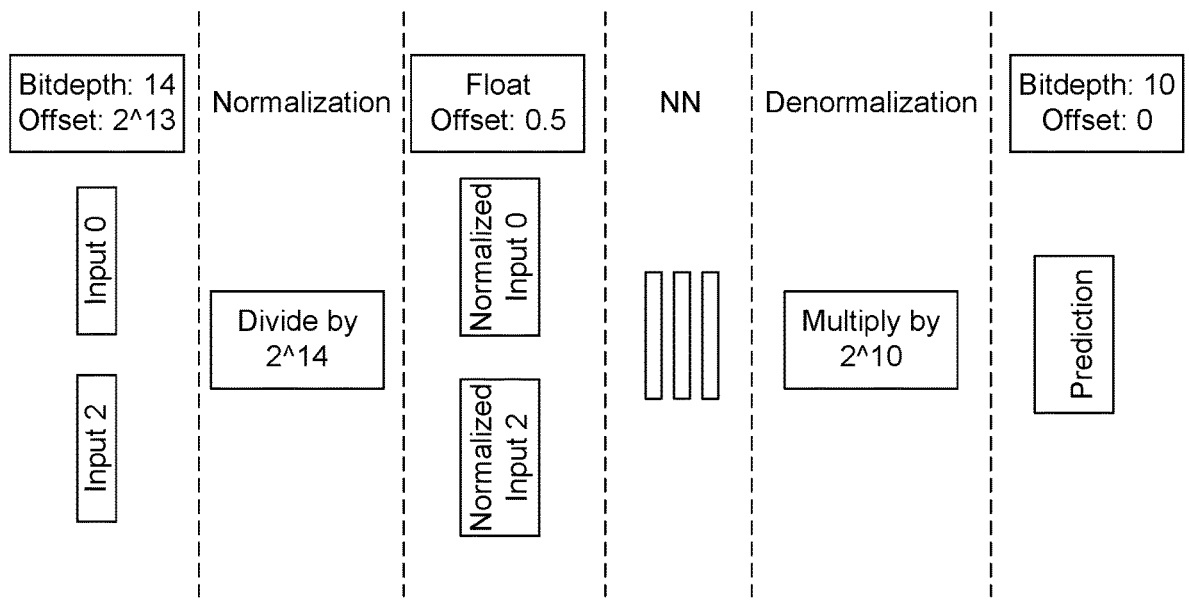
FIG. 31 illustrates an example of normalization and denormalization operations of inputs and outputs for floating point NN.

FIG. 31 illustrates an example of normalization and denormalization operations of inputs and outputs for floating point NN. In this example, input data (Input 0, Input 2) are represented on a first bitdepth, here 14 bits, and centered with an offset of $2^{13}$. Input data are normalized by dividing the values by $2^{14}$. Input data provided to the network NN is thus in floating point with normalized value and offset of 0.5. In case, the NN output directly the prediction, the prediction values are denormalized so to be represented on a second bitdepth, here 10 bits. Denormalization is performed by multiplying the values by $2^{10}$.

When using integer networks, normalization/denormalization operations are replaced by bit shifting operations. For example, assuming an internal bitdepth of 20 to represent input tensors of the network, the inputs are first right shifted by 6: t(x)=I(x)<<6, where I(x) is the data used as input for the network, and t(x) is the input tensor.

Assuming an internal bitdepth of 20 to represent the output tensor results after the blending operation in eq.1, the output is left shifted by 6: O(x)=t(x)>>6, with O being the output tensor of the network.

Advantageously, the needed offset and scaling are learnt by the NN during the training stage.

According to an embodiment, the last layer of the NN is a clip layer with c[0] clipped in [−0.2, 0.2] and c[1]/c[2] clipped in [−0.1, 0.1].

Network Architecture Reduction

Deep learning-based motion compensation brings significant improvement to the prediction process. However, overall complexity of such methods shall be considered. According to an embodiment, small neural networks architecture tailored for the prediction tasks explained above are described here.

Figure 32:
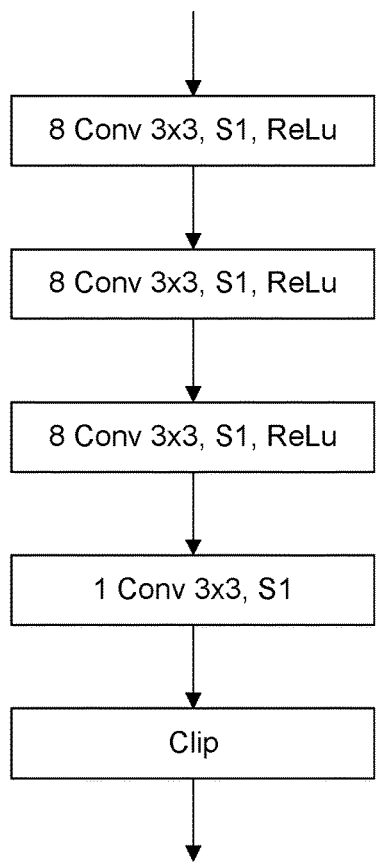
FIG. 32 illustrates an example of a small convolutional Neural Network for determination prediction correction.

FIG. 32 illustrates an example of a small convolutional Neural Network that can be used in any one of the embodiments described above.

In order to keep the complexity low, the NN depicted on FIG. 32 is composed, for example, of few "core" consecutives convolutional layers (3 in this example), each having "few" convolutional kernels (8 in this example), +1 convolutional layer having 2 convolutional kernels (this layer returning the c[0] et c[1] channels), and the last clip layer.

Each layer (except the convolutional layer returning c[0], c[1] and eventually c[2]) also performs a non-linear activation, typically ReLU or LeakyReLU.

In another variant, the last clip layer is removed and the convolutional layer returning the coefficients c[0], c[1] and eventually c[2] applies a bounded non-linear activation after convolving and adding biases. This limits the range of the coefficients. For instance, the bounded non-linear activation can be a scaled hyperbolic tangent f(x)=0.2 tanh(x). As another example, the bounded non-linear activation can be a scaled and offset sigmoid, e.g. g(x)=0.4((1/(1+exp(-x)))-0.5). Here, f(x) and g(x) belongs to [-0.2,0.2]. Any scale can be used to obtain the wanted range for c[0], c[1] or c[2]. In another variant, the single bounded non-linear activation in the convolutional layer returning the c coefficients is replaced by two or three different bounded non-linear activations for c[0], c[1] and c[2] respectively.

In order to reduce further the NN complexity, several network architecture variants can be used. In a variant the blending operation (step 2802 in FIG. 28 for instance) is removed and the last convolutional layer of the NN (not the clip layer) directly outputs the prediction (as depicted on FIG. 29). In this case, the final clip layer clips the value in the range [0,1] (or [0,$2^b$[with b the bitdepth in case of quantized NN).

Figure 33:
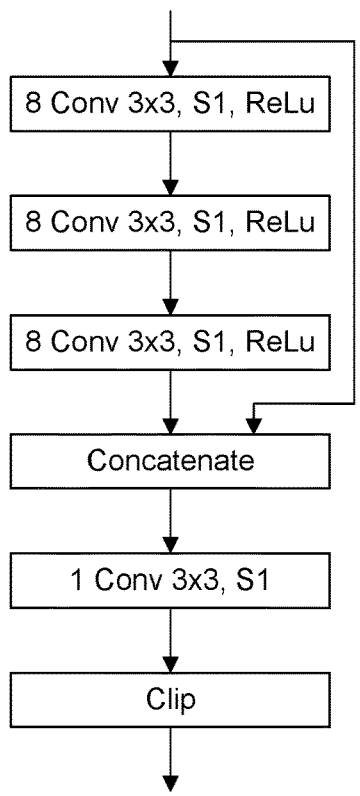
FIG. 33 illustrates another example of a convolutional Neural Network for determination prediction correction comprising a skip connection with concatenation.
Figure 34:
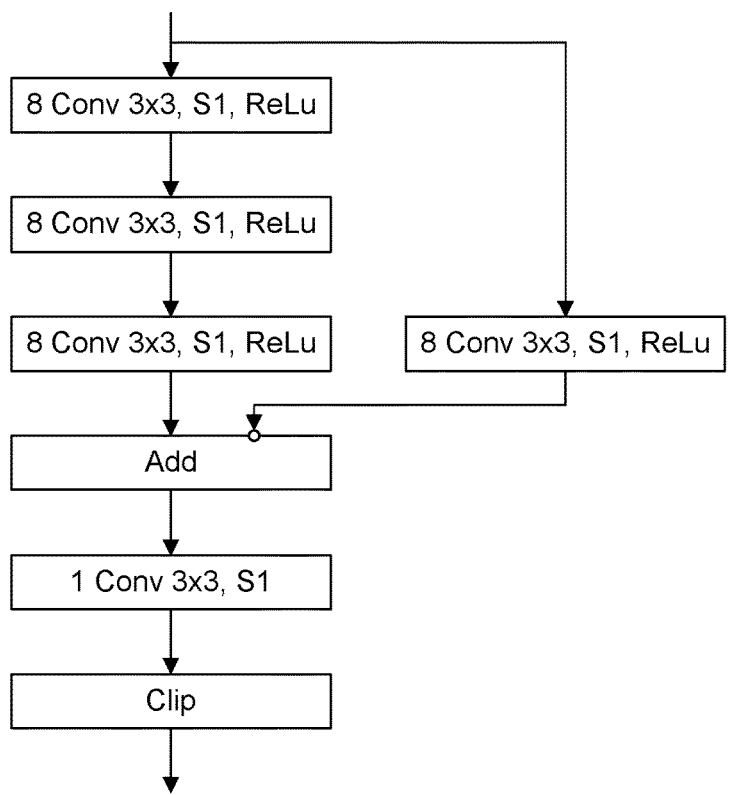
FIG. 34 illustrates another example of a convolutional Neural Network for determination prediction correction comprising a skip connection with addition.

According to another variant, in order to improve the convergence, the reference samples inputs pass through a skip connection and are used in the last convolutional layer of the NN after concatenation (FIG. 33) or addition (FIG. 34). In both cases, the main branch of the NN computes the correction from the inputs (optionally taking into account not only the reference samples but also additional information as described below), while the skip connection takes only the reference samples channels and is either concatenated (FIG. 33) to the result or convoluted (to adapt for the tensor size) and added (FIG. 34). In this case, the number of convolutions performed in the skip connection is equal to the number of convolutions of the layer of the main branch.

In another variant depicted in FIG. 35, the output tensor of the main branch is first split into 2 parts: one part having a size compatible with the inputs size and a remaining part. The first part is added to the inputs, then concatenated with the remaining part. The resulting tensor is then fed to the remaining layer of the network.

According to another embodiment, the layers depth can vary to allow a software friendly implementation. According to this embodiment, for a software friendly implementation of the computations performed in a layer of the neural network, the depth of the tensor input to the layer should be a multiple of a power of 2. Therefore, when the network comprises more than one layer, the tensor output by a preceding layer should have a depth which is a multiple of a power of 2. The depth of the output tensor being given by the number of convolutions performed in the layer, according to this embodiment, each layer has a number of convolutions which is a multiple of a power of 2. The number of convolutions can also be a sum of power of 2.

For instance, a variant of the embodiment illustrated in FIG. 33 is to use for each layer, a number of convolutions that is a multiple of a power of 2, except for the layer before the concatenation. When the network comprises a concatenation layer, the output of the concatenation layer should be a multiple of a power of 2. Therefore, the layer before the concatenation layer should have a number of convolutions which is N−x, where N and x are multiples of a power of 2 and x being the depth of the tensor that is concatenated with the output of layer before the concatenation layer.

For instance, in the case of the embodiment of FIG. 33, the concatenation layer takes as input a tensor of depth 2 (prediction blocks $\tilde{I}_1^0$ and $\tilde{I}_1^2$) and the output of the third layer which is a tensor having a depth of 8. In the variant of FIG. 33, the output tensor of the concatenation layer has a depth of 10. According to the embodiment described here, the network illustrated in FIG. 33 is modified so that the layer before the concatenation layer has a number of convolutions which is N−2, where N is a multiple of a power of 2.

Figure 42:
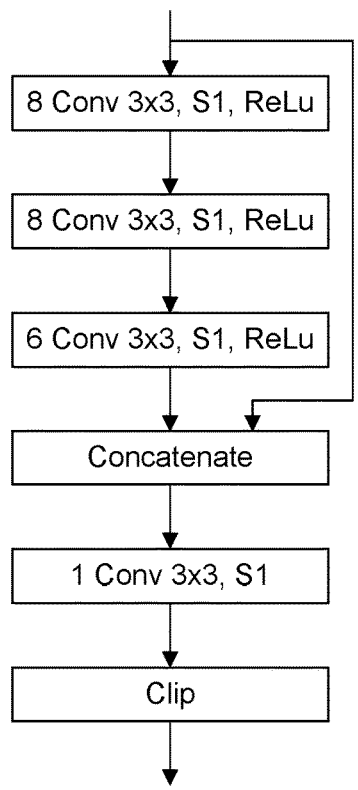
FIG. 42 illustrates another example of a convolutional Neural Network for determination prediction correction comprising a skip connection with concatenation.
Figure 43:
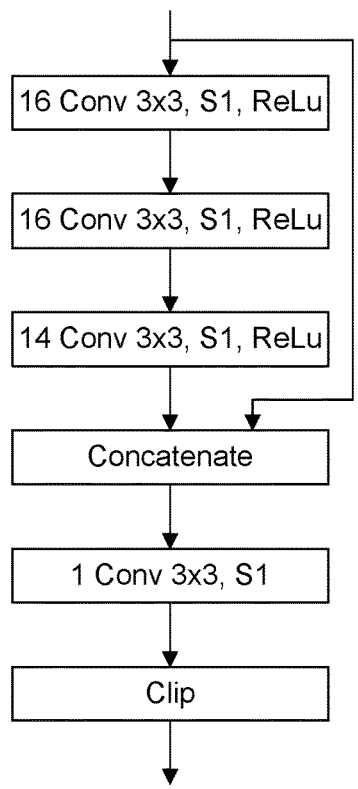
FIG. 43 illustrates another example of a convolutional Neural Network for determination prediction correction comprising a skip connection with concatenation.

FIGS. 42 and 43 illustrates examples of such an embodiment. FIG. 42, respectively FIG. 43, shows an example of implementation with a width of 8, respectively 16, where the layer before the concatenation is 6, respectively 14.

This variant is described for the embodiment illustrated on FIG. 33, but the variants described above could be implemented for any neural networks used in any one the embodiments described herein.

According to another embodiment, in order to limit complexity, pixel-based correction can be replaced by sub-block-based correction. FIG. 36 shows a modified network where the first layer performs a strided convolution. At the end, the final tensor is expanded in the spatial direction with a factor 2 (as only 1 stride is used here). To further reduce the complexity, more strided convolution layers can be used and the expansion layer is adapted accordingly). In this example, compared to the NN in FIG. 32 which requires 1441 MACs/samples (MAC: Multiply-and-Accumulate operation), the NN in FIG. 36 requires only 361 MACs/samples.

Figure 37:
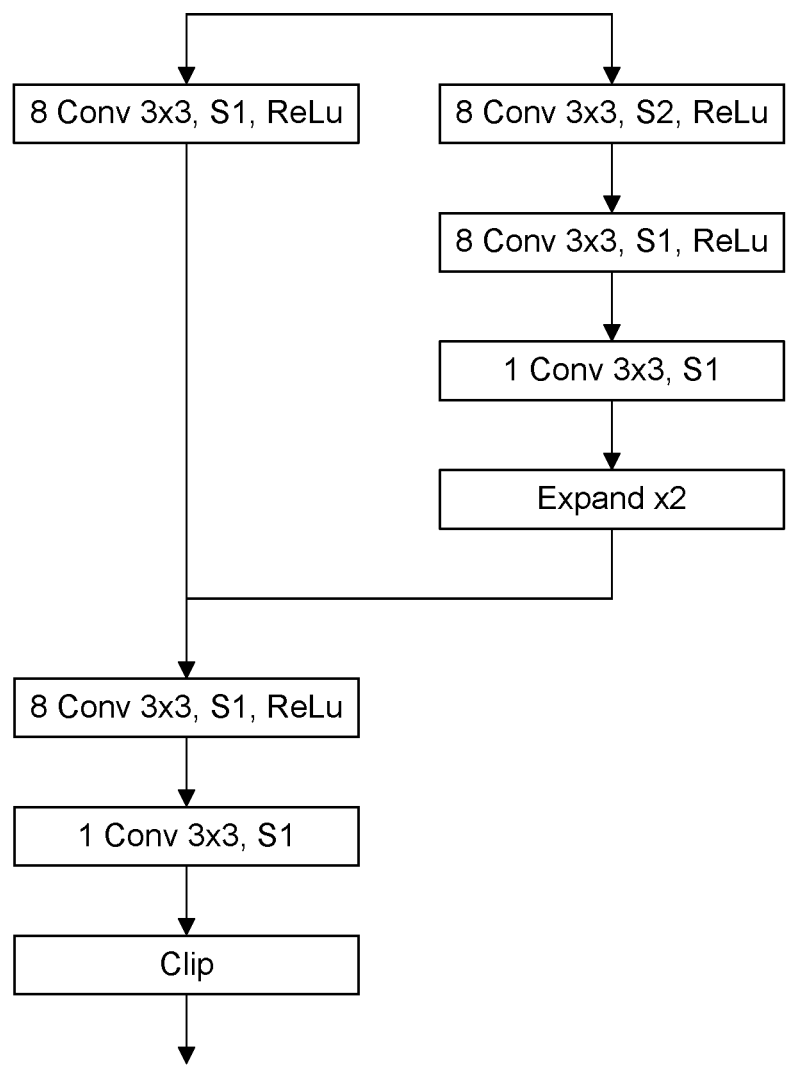
FIG. 37 illustrates another example of a convolutional Neural Network for determination prediction correction with multi-resolution terms computation.

According to another embodiment, the neural network performs computation at several block size level, as depicted in FIG. 37 showing an example of neural network with multi-resolution terms computation. In this case, each branch of the network processes the inputs at different "resolution" depending on the first layer stride. At the end, the result is concatenated, and the final correction terms are output. This variant can be applied to both the NN outputting the map of prediction parameters and the neural network directly outputting the prediction block.

Figure 38:
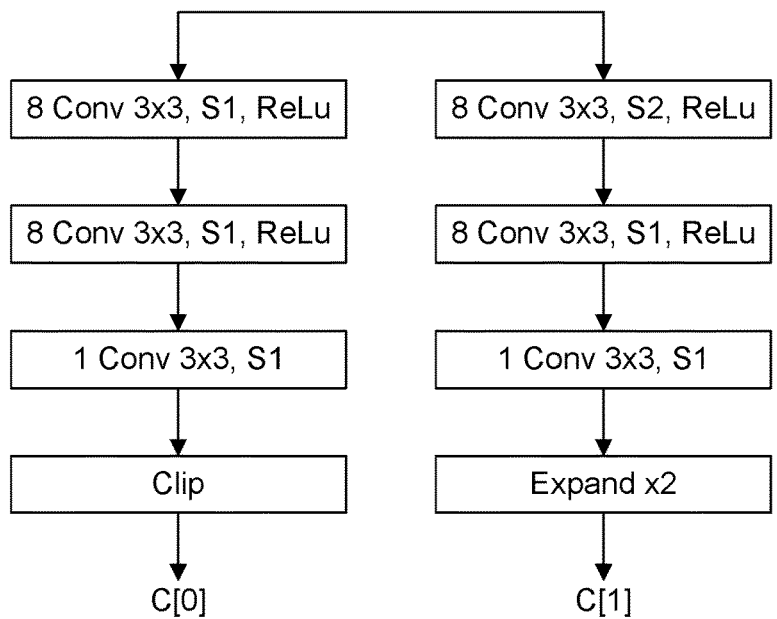
FIG. 38 illustrates another example of a convolutional Neural Network for determination prediction correction with multi-size term computation.

According to another embodiment, the block size computation of each term c[i], with i being, 0, 1 or 2 is chosen explicitly, as illustrated on FIG. 38. FIG. 38 illustrates an example of a convolutional Neural Network with multi-size term computation, in the case of the two terms in the blending model. The scaling term c[1] is computed using a 2×2 block size and an expand layer is used at the end so that the output tensor has a same size of the current block, while the c[0] correction term is computed on a pixel basis. This variant is only applied to the NN outputting the map of prediction parameters.

Figure 39:
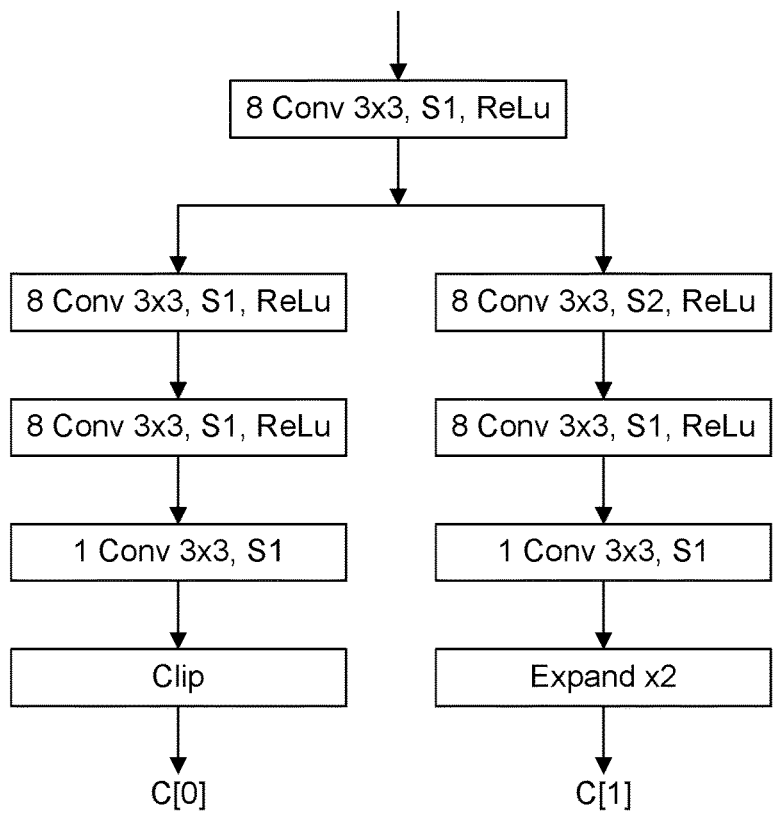
FIG. 39 illustrates another example of a convolutional Neural Network for determination prediction correction with multi-size term computation, according to another variant.

In another variant illustrated on FIG. 39, part of the network is shared at the beginning between branches. For instance, a first convolutional layer is applied, then its output is fed to each branch computing the respective c[ ] and c[1] terms.

Inputs Enhancement

According to another embodiment, in order to improve the correction or prediction accuracy, additional information can be fed to the NN.

According to a variant, additional information comprises information representative of filter used in motion-compensation. The type of filter used to produce the input motion compensated blocks may be useful for the NN. For example, in most codecs, the filter depends on the fractional part of the motion. Typically, for a motion compensation up to the 1/16 pixel, 16 filters are available. The vertical and horizontal fraction part of the motion are used. It leads to the creation of 2 additional inputs per reference (i.e., 4 additional inputs in total) for the network.

Figure 40:
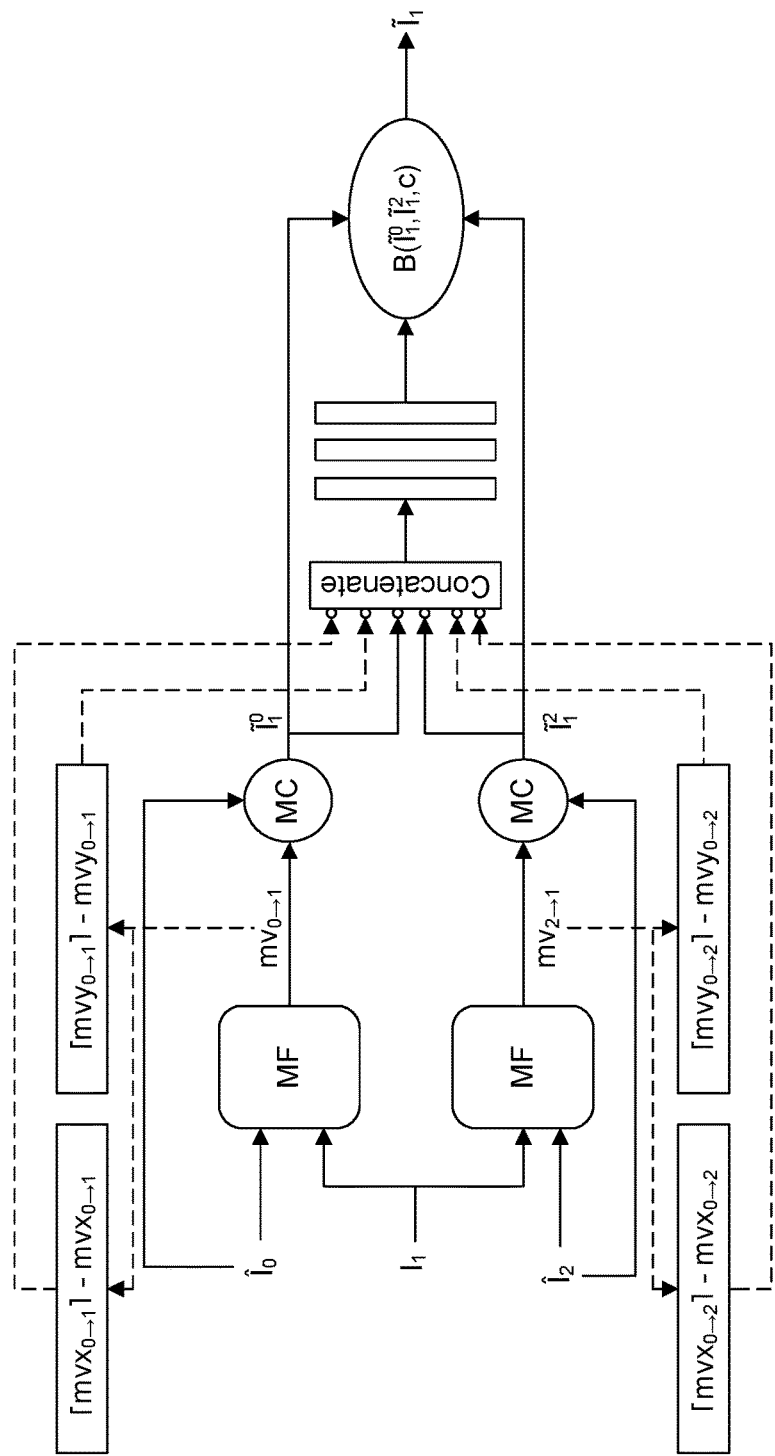
FIG. 40 illustrates a method for determining a blended prediction block, according to an embodiment.

In order to get a normalized input (for floating point NN), the fractional part of the motion is divided by the number of possible filters (here 16 in the example). FIG. 40 illustrates a method for determining a blended prediction block, according to an embodiment wherein an additional path (depicted in dash line) provides the filter information to the neural network (using an example with 16 different filters). The additional path comprises:

Splitting the motion vectors obtained at the motion estimation or decoded from the bitstream on the decoder side, into two components x and y, Computing the fractional part by subtracting the integer (ceiling operation in the figure) to the float point motion.

Concatenating all the fractional part channels and the inputs to create the new input tensor.

Figure 41:
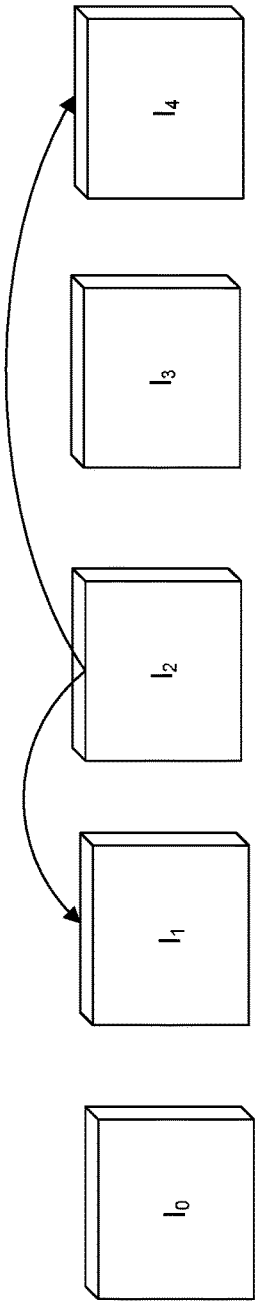
FIG. 41 illustrates an example of asymmetry in the reference frames used to reconstruct a block.

According to another variant, additional information may be related to the motion symmetry between the block to reconstruct and the reference blocks. The additional information comprises an information representative of a frame temporal difference. FIG. 41 shows an example of asymmetry in the reference frames (here frame t=1 and t=4) used to reconstruct a block (here at temporal time t=2). In the example of FIG. 41, a block in image $I_2$ uses a past reference frame at a temporal distance of −1 and a future reference frame at a temporal distance of 2.

In order to take into account this information, 2 additional channels are inputs in the NN using the normalized frame temporal distance of each reference. The normalization factor is chosen as the maximum distance between a frame and its reference frame (excluding long-term reference picture). For instance, in a GOP of size 16, the normalized factor can for example be set to 32.

According to another variant, additional information may relate to the quality of the reference frame. The quality can be deduced from the QP used to encode the block. In case of multiple QP inside the reference block, the maximum, minimum or median QP is used. The QP information also adds 2 channels to the input (one for each reference block).

Online Network

According to an embodiment, as the network is kept small, online adaption of the neural network is possible. Such an adaption can be made per GOP, or per sequence, or per frame. In this embodiment, the NN changes are sent to the decoder at the beginning of each GOP for instance. The NN changes can be sent in the bitstream that comprises the encoded picture or video or in another stream. Note that at encoder side, a simple fine-tuning or partial NN retraining of the default network is necessary.

Training of the Neural Networks

The above networks are trained using prediction blocks, additional information (as filters of the motion compensation stage, temporal distance and QP) and the ground truth as the current block to reconstruct. The dataset is composed of a large number of such blocks extracted from video sequences. As the block sizes may vary, a binary mask is also associated with each data samples in order to compute the relevant loss only on the block itself.

A loss function is computed based on a mean square error (or any other relevant metric) between the block of the current frame and the reconstructed block. As explained above, other regularization term can also be applied during the training stage (absolute norm of the weights, absolute norm of the output coefficients etc.).

Advantageously, as explained above, the training process can be done jointly with other NN based prediction enhancement modules.

The resulting prediction $\tilde{I}_1$ is compared to the original block $I_1$ using a loss function $\nabla$ typically a L1 or L2 norm.

Figure 24:
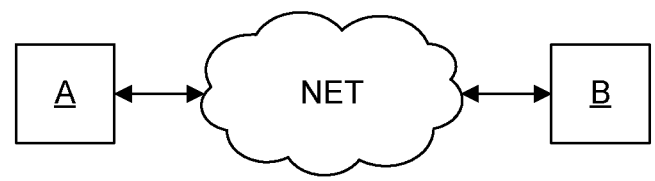
FIG. 24 shows two remote devices communicating over a communication network in accordance with an example of present principles.

According to an example of the present principles, illustrated in FIG. 24, in a transmission context between two remote devices A and B over a communication network NET, the device A comprises a processor in relation with memory RAM and ROM which are configured to implement a method for encoding a video comprising obtaining a prediction for a block of a picture as described in relation with the FIGS. 1-41 and the device B comprises a processor in relation with memory RAM and ROM which are configured to implement a method for decoding a video comprising obtaining a prediction for a block of a picture as described in relation with the FIGS. 1-41.

In accordance with an example, the network is a broadcast network, adapted to broadcast/transmit encoded video from device A to decoding devices including the device B.

Figure 25:
FIG. 25 shows the syntax of a signal in accordance with an example of present principles.

A signal, intended to be transmitted by the device A, carries at least one bitstream comprising coded data representative of the encoded video. FIG. 25 shows an example of the syntax of such a signal transmitted over a packet-based transmission protocol. Each transmitted packet P comprises a header H and a payload PAYLOAD.

Figure 26:
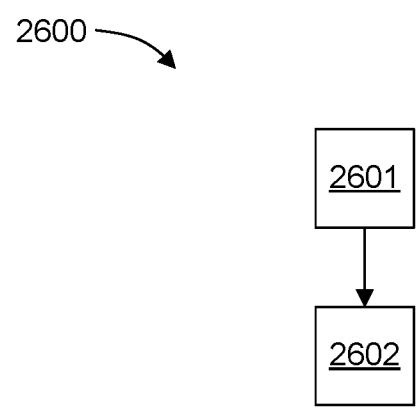
FIG. 26 illustrates an exemplary method for transmitting a signal according to an embodiment.

FIG. 26 illustrates an embodiment of a method (2600) for transmitting a signal according to any one of the embodiments described above. Such a method comprises accessing data (2601) comprising such a signal and transmitting the accessed data (2602) via a communication channel that may be implemented, for example, within a wired and/or a wireless medium. According to an embodiment, the method can be performed by the device 100 illustrated on FIG. 1 or device A from FIG. 24.

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

According to an embodiment, all or parts of the video encoder and decoder described in reference to FIG. 2 and FIG. 3 may be implemented using Neural Networks, or Deep Neural Networks (DNN).

Various methods and other aspects described in this application can be used to modify modules, for example, the motion refinement and motion compensation modules (270, 272, 372, 375), the blending prediction modules (263, 373) of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application. The specific values are for example purposes and the aspects described are not limited to these specific values.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or" C and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a quantization matrix for de-quantization. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method, comprising:
   obtaining a first motion-compensated region for a block of a picture and obtaining a second region for the block;
   providing as input to a main branch of a neural network the first motion-compensated region and the second region;

providing as input to a skip connection of the neural network a tensor that concatenates the first motion-compensated region and the second region;
obtaining from the skip connection a combination of the tensor with an output of a layer of the main branch of the neural network, wherein obtaining the combination includes one of: concatenating the tensor with the output of the layer of the main branch or performing a convolution on the tensor and adding the convoluted tensor to the output of the layer of the main branch;
performing a convolution on the combination obtained from the skip connection;
obtaining a prediction for the block based on an output of the convolution performed on the combination obtained from the skip connection; and
encoding the block based on the prediction.

2. The method of claim 1, wherein the prediction is output by the Neural Network.

3. The method of claim 1, wherein obtaining a prediction for the block comprises:
obtaining a map of prediction refinement parameters for the block using the neural network, wherein the neural network uses the first motion-compensated region and the second region; and
obtaining the prediction for the block based at least on the first motion-compensated region and the map of prediction refinement parameters.

4. The method of claim 3, wherein the neural network comprises one branch per prediction parameter of the map of prediction refinement parameters, and wherein the branch comprises at least one convolutional layer.

5. The method of claim 4, wherein a different block size is used for each branch of the neural network.

6. The method of claim 1, wherein the second region comprises a second motion-compensated region for the block.

7. An apparatus, comprising one or more processors, wherein the one or more processors are configured to:
obtain a first motion-compensated region for a block of a picture and obtain a second region for the block;
provide as input to a main branch of a neural network the first motion-compensated region and the second region;
provide as input to a skip connection of the neural network a tensor that concatenates the first motion-compensated region and the second region;
obtain from the skip connection a combination of the tensor with an output of a layer of the main branch of the neural network, wherein obtaining the combination includes one of: concatenating the tensor with the output of the layer of the main branch or performing a convolution on the tensor and adding the convoluted tensor to the output of the layer of the main branch;
perform a convolution on the combination obtained from the skip connection;
obtain a prediction for the block based on an output of the convolution performed on the combination obtained from the skip connection; and
encode the block based on the prediction.

8. The apparatus of claim 7, wherein the neural network comprises a set of convolutional layers, and wherein a number of convolutions for each layer is a multiple of a power of 2.

9. A method, comprising:
obtaining a first motion-compensated region for a block of a picture and obtaining a second region for the block;
providing as input to a main branch of a neural network the first motion-compensated region and the second region;
providing as input to a skip connection of the neural network a tensor that concatenates the first motion-compensated region and the second region;
obtaining from the skip connection a combination of the tensor with an output of a layer of the main branch of the neural network, wherein obtaining the combination includes one of: concatenating the tensor with the output of the layer of the main branch or performing a convolution on the tensor and adding the convoluted tensor to the output of the layer of the main branch;
performing a convolution on the combination obtained from the skip connection;
obtaining a prediction for the block based on an output of the convolution performed on the combination obtained from the skip connection; and
decoding the block based on the prediction.

10. The method of claim 9, wherein additional data is provided to the neural network, wherein the additional data comprises at least one of the following:
an information representative of a filter used for motion compensation;
an information representative of a quantization parameter used for encoding the block; or
an information representative of at least one motion field determined for the block.

11. The method of claim 9, wherein the first motion-compensated region and the second region are respectively enlarged according to at least a size of a receptive field of the neural network before being used by the neural network.

12. An apparatus, comprising one or more processors, wherein the one or more processors are configured to:
obtain a first motion-compensated region for a block of a picture and obtain a second region for the block;
provide as input to a main branch of a neural network the first motion-compensated region and the second region;
provide as input to a skip connection of the neural network a tensor that concatenates the first motion-compensated region and the second region;
obtain from the skip connection a combination of the tensor with an output of a layer of the main branch of the neural network, wherein obtaining the combination includes one of: concatenating the tensor with the output of the layer of the main branch or performing a convolution on the tensor and adding the convoluted tensor to the output of the layer of the main branch;
perform a convolution on the combination obtained from the skip connection;
obtain a prediction for the block based on an output of the convolution performed on the combination obtained from the skip connection; and
decode the block based on the prediction.

13. The apparatus of claim 12, wherein in obtaining the combination, the layer of the main branch is a last convolutional layer of the neural network.

14. The apparatus of claim 12, wherein the layer of the main branch has a number N−2 of convolutions where N is a multiple of a power of 2.

15. The apparatus of claim 12, wherein the output of the layer of the main branch is split in a first part having a size corresponding to a size of an input of the skip connection and a second part, the first part being added to the input of the skip connection, concatenated with the second part and provided to a next layer of the neural network.

16. The apparatus of claim 12, further comprising at least one of: an antenna configured to receive a signal, the signal including data representative of the picture; a band limiter configured to limit the received signal to a band of frequencies that includes the data representative of the picture; or a display configured to display the picture.

17. The apparatus of claim 16, further comprising a television, a cell phone, a tablet, or a set top box.

18. The apparatus of claim 12, wherein additional data is provided to the neural network, and wherein the additional data comprises at least one of the following:
- an information representative of a filter used for motion compensation;
- an information representative of a quantization parameter used for encoding the block; or
- an information representative of at least one motion field determined for the block.

19. A computer readable storage medium having stored thereon instructions for causing one or more processors to perform a method comprising:
- obtaining a first motion-compensated region for a block of a picture and obtaining a second region for the block;
- providing as input to a main branch of a neural network the first motion-compensated region and the second region;
- providing as input to a skip connection of the neural network a tensor that concatenates the first motion-compensated region and the second region;
- obtaining from the skip connection a combination of the tensor with an output of a layer of the main branch of the neural network, wherein obtaining the combination includes one of: concatenating the tensor with the output of the layer of the main branch or performing a convolution on the tensor and adding the convoluted tensor to the output of the layer of the main branch;
- performing a convolution on the combination obtained from the skip connection;
- obtaining a prediction for the block based on an output of the convolution performed on the combination obtained from the skip connection; and
- encoding the block based on the prediction.

20. A computer readable storage medium having stored thereon instructions for causing one or more processors to perform a method comprising:
- obtaining a first motion-compensated region for a block of a picture and obtaining a second region for the block;
- providing as input to a main branch of a neural network the first motion-compensated region and the second region;
- providing as input to a skip connection of the neural network a tensor that concatenates the first motion-compensated region and the second region;
- obtaining from the skip connection a combination of the tensor with an output of a layer of the main branch of the neural network, wherein obtaining the combination includes one of: concatenating the tensor with the output of the layer of the main branch or performing a convolution on the tensor and adding the convoluted tensor to the output of the layer of the main branch;
- performing a convolution on the combination obtained from the skip connection;
- obtaining a prediction for the block based on an output of the convolution performed on the combination obtained from the skip connection; and
- decoding the block based on the prediction.

\* \* \* \* \*